US012747023B2

(12) United States Patent
Kim et al.

(10) Patent No.: US 12,747,023 B2
(45) Date of Patent: Sep. 29, 2026

(54) APPARATUS FOR CONTROLLING TEMPERATURE AND PRESSURE OF AIRCRAFT

(71) Applicants: Hyundai Motor Company, Seoul (KR); Kia Corporation, Seoul (KR)

(72) Inventors: Gwi Taek Kim, Incheon (KR); Ji Won Hwang, Seoul (KR); Mi Jin Kim, Gwacheon-Si (KR); Woo Suk Jung, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 18/234,756

(22) Filed: Aug. 16, 2023

(65) Prior Publication Data

US 2024/0317408 A1 Sep. 26, 2024

(51) Int. Cl.
*B64D 13/08* (2006.01)
*B64D 13/06* (2006.01)
(Continued)

(52) U.S. Cl.
CPC ............ *B64D 13/08* (2013.01); *B64D 13/06* (2013.01); *B64D 27/24* (2013.01); *B64D 33/08* (2013.01);
(Continued)

(58) Field of Classification Search
CPC ........ B64D 13/08; B64D 27/24; B64D 33/08; B64D 2013/0648; B64D 2013/0688;
(Continued)

(56) References Cited

U.S. PATENT DOCUMENTS 2,622,406 A * 12/1952 Scofield ................. B64D 13/06 62/331
2,734,443 A * 2/1956 Wood ..................... B64D 13/04 454/71

(Continued)

FOREIGN PATENT DOCUMENTS

FR 2829466 A1 * 3/2003 ............. B64D 13/06
KR 10-2014-0115432 A 10/2014

(Continued)

OTHER PUBLICATIONS

FR2829466A1, machine translation (Year: 2025).*
Feb. 23, 2024—European Search Report—EP Application No. 23203724.2.

*Primary Examiner* — Eric S Ruppert
*Assistant Examiner* — Kirstin U Oswald
(74) *Attorney, Agent, or Firm* — Banner & Witcoff, Ltd.

(57) ABSTRACT

An apparatus for controlling temperature and pressure may include: a shaft installed in an aircraft, the shaft being rotatable by having a motor coupled thereto; a compressor, rotatable by being connected to the shaft, configured to form a flow of heated compressed air by compressing external air introduced into the aircraft; a heat exchanger configured to heat-exchange the heated compressed air with a portion of external air introduced into the aircraft; a turbine, rotatable by being connected to the shaft, configured to form a flow of cooling air by expanding the heat-exchanged compressed air; and a cooling heat exchanger configured to exchange heat between a refrigerant cooling a fuel cell power train in the aircraft and the cooling air.

18 Claims, 9 Drawing Sheets

(51) Int. Cl.
*B64D 27/24* (2024.01)
*B64D 33/08* (2006.01)
*H01M 8/04029* (2016.01)

(52) U.S. Cl.
CPC ................. *B64D 2013/0611* (2013.01); *B64D 2013/0618* (2013.01); *B64D 2013/0644* (2013.01); *B64D 2013/0648* (2013.01); *B64D 2013/0688* (2013.01); *H01M 8/04029* (2013.01)

(58) Field of Classification Search
CPC .... B64D 2013/0611; B64D 2013/0618; B64D 2013/0644; B64D 13/06; H01M 8/04029; Y02T 50/50
USPC ........................................................... 62/239
See application file for complete search history.

(56) References Cited

U.S. PATENT DOCUMENTS

| | | | | | | |
|---|---|---|---|---|---|---|
| 2,767,561 | A | * | 10/1956 | Seeger, I | B64D 13/06 | 62/177 |
| 2,867,989 | A | * | 1/1959 | Mcguff | B64D 13/00 | 62/402 |
| 2,979,916 | A | * | 4/1961 | Mason | F28F 27/02 | 236/92 R |
| 3,093,470 | A | * | 6/1963 | Gorken | B64G 1/46 | 62/DIG. 1 |
| 3,494,145 | A | * | 2/1970 | Hunt | F25B 9/06 | 62/88 |
| 3,657,898 | A | * | 4/1972 | Ness | F25J 3/04381 | 62/402 |
| 4,295,518 | A | * | 10/1981 | Rannenberg | F24F 5/0085 | 62/401 |
| 4,546,939 | A | * | 10/1985 | Cronin | F04D 27/0261 | 454/74 |
| 5,056,335 | A | * | 10/1991 | Renninger | B64D 13/06 | 62/402 |
| 5,086,622 | A | * | 2/1992 | Warner | B64D 13/06 | 62/88 |
| 5,143,329 | A | * | 9/1992 | Coffinberry | F02C 7/32 | 244/209 |
| 5,461,882 | A | * | 10/1995 | Zywiak | B64D 13/06 | 62/401 |
| 5,813,630 | A | * | 9/1998 | Williams | B64D 41/00 | 454/71 |
| 5,899,085 | A | * | 5/1999 | Williams | B64D 13/06 | 62/236 |
| 5,956,960 | A | * | 9/1999 | Niggeman | B64D 13/06 | 60/785 |
| 5,967,461 | A | * | 10/1999 | Farrington | B64D 13/06 | 454/115 |
| 6,058,715 | A | | 5/2000 | Strang et al. | | |
| 6,070,418 | A | * | 6/2000 | Crabtree | B64D 13/06 | 62/401 |
| 6,128,909 | A | * | 10/2000 | Jonqueres | B64D 13/06 | 62/93 |
| 6,415,595 | B1 | * | 7/2002 | Wilmot, Jr. | F02C 7/224 | 60/785 |
| 6,526,775 | B1 | * | 3/2003 | Asfia | B64D 13/06 | 62/401 |
| 6,629,428 | B1 | * | 10/2003 | Murry | B64D 13/06 | 62/401 |
| 6,735,953 | B1 | | 5/2004 | Wolfe et al. | | |
| 6,796,527 | B1 | * | 9/2004 | Munoz | B64D 13/06 | 60/785 |
| 7,305,842 | B1 | * | 12/2007 | Schiff | B64D 13/06 | 62/401 |
| 10,135,081 | B2 | | 11/2018 | Riordan et al. | | |
| 10,978,723 | B2 | | 4/2021 | Lo et al. | | |
| 2003/0005719 | A1 | * | 1/2003 | Mitani | B64D 37/32 | 62/271 |
| 2004/0195448 | A1 | * | 10/2004 | Flatman | F25B 9/004 | 244/118.5 |
| 2005/0019633 | A1 | * | 1/2005 | Tanaka | H01M 8/04022 | 429/437 |
| 2012/0045701 | A1 | * | 2/2012 | Braun | H01M 8/0618 | 429/423 |
| 2013/0133348 | A1 | * | 5/2013 | Squier | B64D 13/02 | 62/402 |
| 2016/0083100 | A1 | | 3/2016 | Bammann et al. | | |
| 2016/0208819 | A1 | * | 7/2016 | Pal | F04D 25/0606 | |
| 2017/0170494 | A1 | | 6/2017 | Lents et al. | | |
| 2018/0037327 | A1 | | 2/2018 | Hoffjann et al. | | |
| 2018/0281976 | A1 | | 10/2018 | Zywiak et al. | | |
| 2020/0262579 | A1 | | 8/2020 | Long et al. | | |
| 2021/0122487 | A1 | | 4/2021 | Hagshenas et al. | | |
| 2022/0033087 | A1 | | 2/2022 | Bruno et al. | | |
| 2023/0069975 | A1 | | 3/2023 | Quartarone et al. | | |

FOREIGN PATENT DOCUMENTS

| | | | |
|---|---|---|---|
| KR | 10-2020-0025859 | A | 3/2020 |
| KR | 10-2022-0102702 | A | 7/2022 |
| WO | 99/32357 | A1 | 7/1999 |

* cited by examiner

APPARATUS FOR CONTROLLING TEMPERATURE AND PRESSURE OF AIRCRAFT

CROSS-REFERENCE TO RELATED APPLICATION(S)

This application claims benefit of priority to Korean Patent Application No. 10-2023-0035869 filed on Mar. 20, 2023, in the Korean Intellectual Property Office, the disclosure of which is incorporated herein by reference in its entirety.

TECHNICAL FIELD

The present disclosure relates to an apparatus for controlling temperature and pressure of an aircraft that can provide heated compressed air or cooling air to a fuel cell power train while controlling the in-flight temperature, pressure, humidity, and the like, of the aircraft, for example, in an electric propulsion aircraft.

BACKGROUND

In general, an aircraft may be equipped with an apparatus for controlling temperature and pressure. The apparatus for controlling temperature and pressure may extract high-temperature and high-pressure compressed air from an engine, and the extracted compressed air may be supplied to a cabin or a cockpit after adjusting the temperature and pressure in an air conditioner.

The apparatus for controlling temperature and pressure may serve to control pressure of an interior, supply sufficient air for people (e.g., passengers) to feel comfortable in the interior, and control humidity, heating and cooling in the interior.

An air cycle machine, including one or more heat exchangers, a compressor, and one or more turbines, is known as an air conditioner. The air cycle machine may be configured to obtain bleed air from an engine.

Furthermore, as the electrification of the aircraft progresses in stages, a method of coupling a motor to an air cycle machine and supplying electricity generated by an engine to operate the air cycle machine may be used. In some implementations, the air cycle machine may also be linked to the engine in terms of energy supply.

Furthermore, an electric propulsion aircraft using fuel cells as a power source is being researched and developed. However, in this case, because a motor and an inverter are replaced with the engine, a new apparatus for controlling temperature and pressure is required to control in-flight temperature, pressure and humidity, without the engine. Additionally, an additional means for thermal management of a fuel cell power train is required.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure is to provide an apparatus for controlling temperature and pressure of an aircraft that can provide heated compressed air or cooling air to a fuel cell power train, as well as controlling in-flight temperature, pressure and humidity of the aircraft, for example, in an electric propulsion aircraft.

According to an aspect of the present disclosure, an apparatus for controlling temperature and pressure includes: a shaft installed in an aircraft, the shaft being rotatable by having a motor coupled thereto; a compressor, rotatable by being connected to the shaft, and configured to form a flow of heated compressed air by compressing external air introduced into the aircraft; a heat exchanger configured to heat-exchange the heated compressed air with a portion of external air introduced into the aircraft; a turbine, rotatable by being connected to the shaft, and configured to form a flow of cooling air by expanding the heat-exchanged compressed air; and a cooling heat exchanger configured to exchange heat between a refrigerant cooling a fuel cell power train in the aircraft and the cooling air.

The aircraft may include a first air scoop through which the external air is introduced and a second air scoop through which the external air is introduced, the apparatus for controlling temperature and pressure may include external air line configured to form a flow path from the first air scoop and the second air scoop to the compressor, and the external air of the second air scoop may be a ram air.

The apparatus for controlling temperature and pressure may further include an introduction line branched from the external air line and configured to connect the first air scoop and the second air scoop to the heat exchanger, and an air intake fan may be installed in the introduction line.

An air circulation line for circulating air may be disposed in an interior of the aircraft, a first heating line may be connected to the introduction line downstream of the heat exchanger, and a first heating heat exchanger may be disposed between the first heating line and the air circulation line, and heat of the external air in the first heating line may be transmitted from the first heating heat exchanger to air of the air circulation line to perform heating in the interior.

The apparatus for controlling temperature and pressure may further include: a bootstrap line configured to communicate an outlet of the compressor with an inlet of the turbine, and having the heat exchanger disposed therein; and a heating line branched from the bootstrap line and configured to supply heated compressed air flowing from the outlet of the compressor to an air circulation line for circulating air in an interior of the aircraft or a refrigerant circulation line for circulating the refrigerant.

A second heating line may be connected to the heating line, and a second heating heat exchanger may be disposed between the second heating line and the air circulation line, and heat of the heated compressed air flowing through the heating line may be selectively transmitted from the second heating heat exchanger to air of the air circulation line to perform heating in the interior.

A third heating line may be connected between the heating line and the air circulation line, and the heated compressed air may be selectively directly supplied to the air circulation line.

When compressed air is applied to the third heating line and air is circulated without exhaust in the air circulation line, the interior may be pressurized.

A heating heat exchanger may be disposed between the heating line and the refrigerant circulation line, and heat of the heated compressed air flowing through the heating line may be selectively transmitted from the heating heat exchanger to the refrigerant to increase a temperature of the fuel cell power train.

The apparatus for controlling temperature and pressure may further include a cooling line connected to an outlet of the turbine, through which cooling air flowing from the outlet of the turbine flows, and the cooling heat exchanger may be disposed between the cooling line and a refrigerant circulation line for circulating the refrigerant, and a heated refrigerant flowing through the refrigerant circulation line may be selectively cooled by cooling air in the cooling heat exchanger.

A first cooling line may be connected between an air circulation line for circulating air in an interior of the aircraft and the cooling line, and the cooling air may be selectively directly supplied to the air circulation line to perform cooling in the interior.

A second cooling line may be connected to the cooling line, and an air-conditioning heat exchanger may be disposed between an air circulation line for circulating air in an interior of the aircraft and the second cooling line, and air flowing through the air circulation line may be selectively cooled by the cooling air in the air-conditioning heat exchanger to perform cooling in the interior.

The second cooling line may be connected to the cooling heat exchanger downstream of the air-conditioning heat exchanger, and the cooling air may cool the refrigerant in the cooling heat exchanger.

The refrigerant circulation line may be connected to an air circulation line in the aircraft through a refrigerant-air heat exchanger upstream of the cooling heat exchanger, and heat of the heated refrigerant flowing through the refrigerant circulation line may be selectively transmitted from the refrigerant-air heat exchanger to the air of the air circulation line to perform heating in an interior of the aircraft.

According to another aspect of the present disclosure an apparatus for controlling temperature and pressure including: a shaft installed in an aircraft, the shaft being rotatable by having a motor coupled thereto; a compressor, rotatable by being connected to the shaft, and configured to form a flow of heated compressed air by compressing external air introduced into the aircraft; a heat exchanger configured to heat-exchange the heated compressed air with a portion of external air introduced into the aircraft; a turbine, rotatable by being connected to the shaft, and configured to form a flow of cooling air by expanding the heat-exchanged compressed air; a heating line configured to supply the heated compressed air flowing from an outlet of the compressor to an air circulation line for circulating air in an interior of the aircraft or a refrigerant circulation line for circulating a refrigerant cooling a fuel cell power train; and a refrigerant-air heat exchanger disposed between the refrigerant circulation line and the air circulation line, and configured to heat-exchange the refrigerant with air.

A third heating line may be connected between the heating line and the air circulation line, and the heated compressed air may be selectively directly supplied to the air circulation line.

When compressed air is applied to the third heating line and air is circulated without exhaust in the air circulation line, the interior may be pressurized.

A heating heat exchanger may be disposed between the heating line and the refrigerant circulation line, and heat of the heated compressed air flowing through the heating line may be selectively transmitted from the heating heat exchanger to the refrigerant to increase a temperature of the fuel cell power train.

The apparatus for controlling temperature and pressure may further include a cooling line connected to an outlet of the turbine, through which cooling air flowing from the outlet of the turbine flows, and a cooling heat exchanger may be disposed between the cooling line and the refrigerant circulation line, and a heated refrigerant flowing through the refrigerant circulation line may be selectively cooled by cooling air in the cooling heat exchanger.

A first cooling line may be connected between the air circulation line and the cooling line, and the cooling air may be selectively directly supplied to the air circulation line to perform cooling in the interior.

A second cooling line may be connected to the cooling line, and an air-conditioning heat exchanger may be disposed between the air circulation line and the second cooling line, and air flowing through the air circulation line may be selectively cooled by the cooling air in the air-conditioning heat exchanger to perform cooling in the interior.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
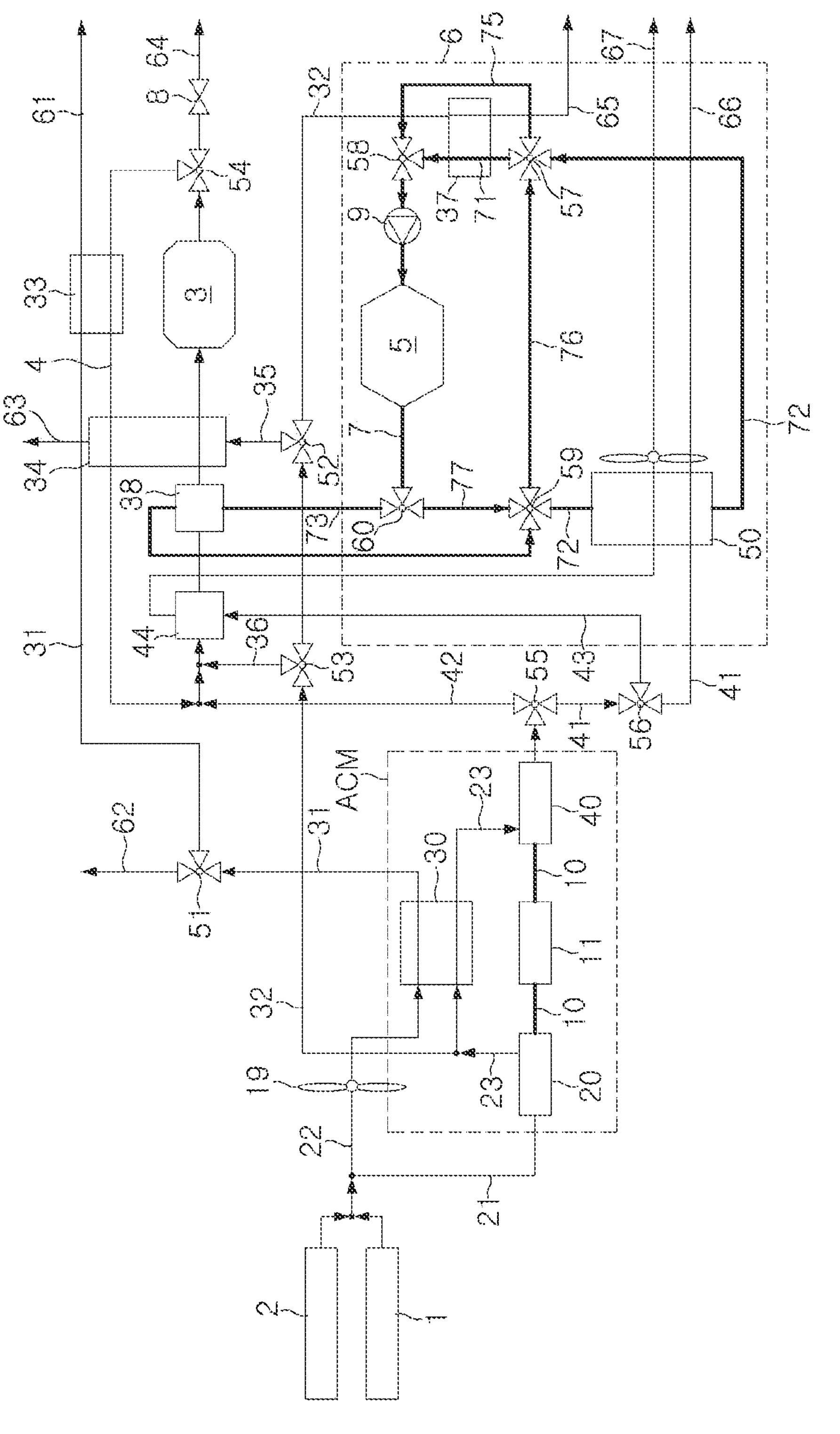
FIG. 1 is a block diagram illustrating an apparatus for controlling temperature and pressure of an aircraft.

Hereinafter, the present disclosure will be described in detail with reference to the accompanying drawings. In adding reference numerals to elements of each of the drawings, although the same elements are illustrated in other drawings, like reference numerals may refer to like elements.

The terms such as "first," "second" or "third" may be used to describe various elements, but these elements are not limited in order, size, position, and importance by terms such as "first," "second," and "third," and may be used for distinguishing one component from other components.

In the present specification, an aircraft may refer to a mobility vehicle configured to fly and move over the air. The aircraft may refer to a rotorcraft, a drone, a tilt rotor aircraft, a vertical take-off and landing aircraft, a fixed-wing aircraft, or the like, and may also include a vehicle that may taxi on the ground using wheels and fly with the wheels separated from the ground. The aircraft may include a manned aircraft and an unmanned aircraft. The manned aircraft may include a fuselage that can operate by autonomous flight in addition to a fuselage controlled by a pilot.

In the present specification, a fuel cell power train may refer to all components configured to generate electrical energy through an electrochemical reaction in an aircraft, transmit the generated electrical energy, and convert the transmitted electrical energy into mechanical energy to provide driving power of the aircraft. The fuel cell power train may include components related to driving power of, for example, a motor, an inverter, and a decelerator, from the fuel cell stack.

Although the present disclosure is described and illustrated based on an example in which an apparatus for controlling temperature and pressure is applied to an electric propulsion aircraft using a fuel cell as a power source for convenience of description, aspects of the present disclosure are not limited thereto. For example, compressed air and cooling air flowing in the apparatus for controlling temperature and pressure may be supplied to other uses in the aircraft.

FIG. 1 is a block diagram illustrating an apparatus for controlling temperature and pressure of an aircraft.

As illustrated in FIG. 1, an apparatus for controlling temperature and pressure of an aircraft may include a shaft 10, a compressor 20, a heat exchanger 30, a turbine 40, and a cooling heat exchanger 50.

The apparatus for controlling temperature and pressure illustrated in FIG. 1 may connect air scoops 1 and 2 to an interior 3 such as a cabin or a cockpit in an aircraft, and may connect the air scoops to a heat management system 6 of a fuel cell power train 5. The apparatus for controlling temperature and pressure may be configured based on an air cycle machine (ACM).

The air cycle machine (ACM) may be configured by connecting the compressor 20 and the turbine 40 with a shaft 10, and by disposing the heat exchanger 30 on a bootstrap line 23 for communicating an outlet of the compressor with an inlet of the turbine. A plurality of compressors and a plurality of turbines may be provided, respectively, so that a multistage compressor and a multistage turbine may be configured.

In the air cycle machine (ACM), a motor 11 driven by power from an inverter (not illustrated) may be connected to the shaft 10 or coupled onto the shaft 10. Due to the driving of the motor, external air having low pressure may also be used.

After the external air is introduced into the apparatus for controlling temperature and pressure of the present disclosure, the external air may be distributed to a cabin, a cockpit, or other internal volume in the aircraft through each line composed of ducts or pipes. The external air may control a temperature, pressure, humidity, and the like, inside the aircraft and may ventilate an interior thereof to create a pleasant internal environment. The external air may be discharged from the aircraft and/or may be returned to the aircraft and circulated.

For example, external air line 21 introducing external air into an inlet of the compressor 20, a cooling line 41 supplying cooling air from an outlet of the turbine 40 to a heat management system 6 of the fuel cell power train 5, a first cooling line supplying the cooling air from the outlet of the turbine to the interior 3, a first heating line 31 supplying an high-temperature external air flowing from the heat exchanger 30 to the interior, a heating line 32 supplying heated compressed air flowing from an outlet of the compressor 20 to the interior or a heat management system may be connected to the air cycle machine (ACM).

The heat exchanger 30 may heat-exchange external air adiabatically compressed by the compressor 20 (i.e., compressed air) with a portion of external air directly introduced from air scoops 1 and 2 bypassing the compressor, thereby enabling a portion of the external air to obtain heat from the compressed air heated in the compressor 20 and cooling the compressed air.

The compressed air may pass through the heat exchanger 30 and flow into the inlet of the turbine 40, and the compressed air may be further cooled while being adiabatically expanded in the turbine to form cooling air. The cooling air may be output from the turbine to the cooling line 41 and/or a first cooling line 42.

Accordingly, the apparatus for controlling temperature and pressure of an aircraft may have increased efficiency and increased cooling performance using a process of heat transmission at a constant pressure, insulation compression, and insulation expansion.

A plurality of air scoops may be provided, and may include, for example, a first air scoop 1 and a second air scoop 2.

When the aircraft is on the ground or at a low altitude near the ground, the external air around the aircraft may flow into the aircraft, for example, through the first air scoop 1.

When the aircraft is cruising at a predetermined altitude or higher, the external air may be introduced into the aircraft, for example, through the second air scoop 2. The external air may be referred to as so-called “ram air.” The apparatus for controlling temperature and pressure of an aircraft may utilize the ram air generated by the operation of the aircraft and introduced into the aircraft with a predetermined pressure. The ram air may be used in other systems or other components in the aircraft.

The external air line 21 may include a flow path from the air scoops 1 and 2 to the compressor 20. An introduction line 22 connecting the air scoop 1 and the heat exchanger 30 may be branched from the external air line 21.

An air intake fan 19 may be installed in the introduction line 22 to promote an introduction of the external air and provide a flow rate. If the air intake fan 19 does not operate (e.g., since there is little air flow through the introduction line), the air intake fan may act as a kind of on-off valve.

The first heating line 31 may be connected to the introduction line 22 downstream of the heat exchanger 30. The external air in the first heating line may transmit heat transmitted from compressed air passing through the heat exchanger by the bootstrap line 23 to the interior 3.

To this end, a first heating heat exchanger 33 may be disposed between the first heating line 31 and an air circulation line 4 in the interior 3, and accordingly, the heat of the first heating line may be transmitted to air circulated along the air circulation line in the interior. Accordingly, heating in the interior may be performed by recovering waste heat of the first heating line and providing the waste heat to the interior.

A first exhaust line 61 may be connected to the first heating line 31 downstream of the first heating heat exchanger 33. The first exhaust line may exhaust a heat-exchanged external air out of the aircraft by an exhaust hole (not illustrated).

The first heating line 31 may be connected to a second exhaust line 62 upstream of the first heating heat exchanger 33. The second exhaust line may exhaust the heat-exchanged external air out of the aircraft by the exhaust hole.

To this end, a first valve 51 may be installed between the first heating line 31 and the second exhaust line 62. In an example, a three-way valve may be adopted as the first valve.

By the first valve 51, the first heating line 31 may selectively supply the heat to the first heating heat exchanger 33, thereby adjusting a temperature of the interior 3 as well as providing or stopping the heating.

The heating line 32 connecting the compressor 20 and the heat management system 6 of the fuel cell power train 5 may be branched from the bootstrap line 23. The heating line may supply heated compressed air flowing from the outlet of the compressor to the air circulation line in the interior 3 and/or a refrigerant circulation line 7 constituting the heat management system 6.

For example, a second heating line 35 may be connected to the heating line 32, and a second heating heat exchanger 34 may be disposed between the second heating line 35 and the air circulation line 4 in the interior 3, so that the heat of the heated compressed air flowing through the heating line may be selectively transmitted to circulating air of the interior. Accordingly, heating in the interior may be performed by providing the heat to the interior.

A second valve 52 may be installed between the heating line 32 and the second heating line 35. In an example, a three-way valve may be adopted as the second valve.

The second heating line 35 may be connected to a third exhaust line 63 downstream of the second heating heat exchanger 34. The third exhaust line 63 may exhaust the heat-exchanged compressed air out of the aircraft by the exhaust hole.

Because a third heating line 36 is connected between the heating line 32 and the air circulation line 4, the heated compressed air may be supplied to the interior 3 with a predetermined pressure.

A third valve 53 may be installed between the heating line 32 and the third heating line 36. In an example, a three-way valve may be adopted as the third valve.

By the third valve 53, the third heating line 36 may selectively and directly supply the heated compressed air to the air circulation line 4, thereby providing or stopping heating and pressurization as well as controlling the temperature and pressure in the interior 3.

The air circulation line 4 may be connected to a fourth exhaust line 64 upstream of the first heating heat exchanger 33. The fourth exhaust line 64 may selectively exhaust air of the interior out of the aircraft by the exhaust hole.

To this end, a fourth valve 54 may be installed between the air circulation line 4 and the fourth exhaust line 64. In an example, a three-way valve may be adopted as the fourth valve 54. A pressure control valve 8 for adjusting air pressure of the interior may be mounted in the fourth exhaust line 64.

Since the fourth valve 54 acts as a valve determining a direction of an air flow path, air circulation or exhaust may be performed according to the operation of the fourth valve 54. The pressure control valve 8 may act as a valve for determining an air flow rate, thereby maintaining an appropriate pressure required in the interior.

Because a heating heat exchanger 37 is disposed between the heating line 32 and the refrigerant circulation line 7, the heat from the heating line 32 may be transmitted to the refrigerant circulation line 7 in the heat management system 6 of the fuel cell power train 5. Among the refrigerant circulation lines, a refrigerant flow path receiving the heat by the heating heat exchanger upstream of the fuel cell power train 5 may be referred to as a refrigerant heating line 71. The refrigerant circulation line 71 may include a first bypass line 75 bypassing the heating heat exchanger.

Accordingly, the apparatus for controlling temperature and pressure of an aircraft may increase an internal temperature of the heat management system 6, and may allow the fuel cell power train 5 to be stably started and operated even in a low temperature environment (e.g., in winter).

The heating line 32 may be connected to a fifth exhaust line 65 downstream of the heating heat exchanger 37. The fifth exhaust line 65 may exhaust the heat-exchanged compressed air out of the aircraft by the exhaust hole.

The cooling line 41 may connect the turbine 40 and the heat management system 6 of the fuel cell power train 5. The cooling air adiabatically expanded and discharged from the turbine may cool the refrigerant of the refrigerant circulation line 7 constituting the heat management system.

For example, the refrigerant circulation line 7 of the heat management system 6 may be connected to the cooling line 41 through the cooling heat exchanger 50. The refrigerant flow path between the refrigerant circulation line and the cooling heat exchanger may be referred to as a refrigerant cooling line 72. The refrigerant circulation line may include a second bypass line 76 bypassing the cooling heat exchanger.

The cooling heat exchanger 50 may include, for example, a radiator-type heat exchanger formed to allow the refrigerant circulating and cooling the fuel cell power train 5 to pass through the inside. The heat exchanger may include a cooling fan. The cooling air of the cooling line 41 may cool the refrigerant by exchanging the heat with the refrigerant inside a radiator while passing through the radiator.

The refrigerant may be a cooling water (or any other types of refrigerant). The refrigerant may be circulated along the refrigerant circulation line 7 constituting the heat management system 6. In this case, the refrigerant circulation line 7 may include a pump 9 for circulating a liquid refrigerant.

However, the shape of the cooling heat exchanger 50 and examples of refrigerants and a pumping device thereof are not necessarily limited to those described above.

Accordingly, the apparatus for controlling temperature and pressure of an aircraft may secure cooling performance for the fuel cell power train 5.

The first cooling line 42 may be connected to the cooling line 41 connected from an outlet of the turbine 40. The first cooling line 42 may supply cooling air branched and flowing from the cooling line 41 to the interior 3.

To this end, a fifth valve 55 may be installed between the first cooling line 42 and the cooling line 41. In an example, a three-way valve may be adopted as the fifth valve.

By the fifth valve 55, the first cooling line 42 may selectively and directly supply the cooling air to the air circulation line 4, thereby adjusting the temperature and pressure in the interior 3 as well as providing or stopping especially cooling, dehumidification, and pressurization.

A second cooling line 43 connecting the turbine 40 and the air circulation line 4 in the interior 3 may be branched from the cooling line 41. The second cooling line 43 may transmit the cooling air from the outlet of the turbine to the air circulation line 4 in the interior 3.

To this end, because an air-conditioning heat exchanger 44 is disposed between the second cooling line 43 and the air circulation line 4 in the interior 3, a chill of the second cooling line 43 may be transmitted to the air of the air circulation line flowing into the interior. Accordingly, cooling may be performed by supplying the chill to the interior.

The second cooling line 43 may supply the cooling air to the cooling heat exchanger 50, for example, in the form of a radiator, downstream of the air-conditioning heat exchanger 44. While the cooling air of the second cooling line 43 passes through the radiator, the cooling air may exchange heat with the refrigerant inside the radiator, thus cooling the refrigerant.

A sixth valve 56 may be installed between the second cooling line 43 and the cooling line 41. In an example, a three-way valve may be adopted as the sixth valve 56.

By the sixth valve 56, the second cooling line 43 may selectively supply the chill to the air-conditioning heat exchanger 44 and the cooling heat exchanger 50, thus performing cooling of the fuel cell power train 5 simultaneously with cooling in the interior 3.

The cooling line 41 and the second cooling line 43 may be connected to a sixth exhaust line 66 and a seventh exhaust line 67 downstream of the cooling heat exchanger 50, respectively. The sixth exhaust line 66 and the seventh exhaust line 67 may exhaust the heat-exchanged cooling air out of the aircraft by the exhaust hole.

The apparatus for controlling temperature and pressure of an aircraft may transmit the heat generated by the fuel cell power train 5 to the air circulating in the interior 3.

For example, the refrigerant circulation line 7 of the heat management system 6 may be connected to the air circulation line 4 in the interior 3 through a refrigerant-air heat exchanger 38 upstream of the cooling heat exchanger 50. A refrigerant flow path between the refrigerant circulation line and the refrigerant-air heat exchanger may be referred to as a fourth heating line 73. The refrigerant circulation line may include a third bypass line 77 bypassing the refrigerant-air heat exchanger.

The refrigerant heated in the fuel cell power train 5 may transmit the heat to the air of the air circulation line 4 flowing into the interior 3 while passing through the refrigerant-air heat exchanger 38. Accordingly, additional heating in the interior may be performed by recovering waste heat from the fuel cell power train 5 and providing heat to the interior.

If the refrigerant circulation line 7 is equipped with a plurality of bypass lines, a plurality of valves may be arranged for branching and connecting, and for selection of flow paths.

For example, a seventh valve 57 may be installed on one side of the refrigerant heating line 71, one side of the first bypass line 75, one side of the second bypass line 76 and one side of the refrigerant cooling line 72. In an example, a four-way valve may be adopted as the seventh valve 57.

An eighth valve 58 may be installed on the refrigerant circulation line 7, the other side of the refrigerant heating line 71 and the other side of the first bypass line 75. In an example, a three-way valve may be adopted as the eighth valve 58.

A ninth valve 59 may be installed on the other side of the refrigerant cooling line 72, the other side of the second bypass line 76, one side of the third bypass line 77 and one side of the fourth heating line 73. In an example, a four-way valve may be adopted as the ninth valve 59.

A tenth valve 60 may be installed on the refrigerant circulation line 7, the other side of the third bypass line 77 and the other side of the fourth heating line 73. In an example, a three-way valve may be adopted as the tenth valve 60.

As the three-way valve and the four-way valve described above, an electric valve driven by a driving motor (not illustrated) connected to a separate power source under the control of a controller (not illustrated) described below may be employed. Opening/closure or an opening degree of an internal valve body may be controlled while the internal valve body rotates at a predetermined angle, for example, based on a zero point according to driving of the driving motor, thus enabling a valve to determine a flow direction and a flow path of air. The valve may control a flow rate of air flowing to each line.

The controller may be electrically connected to an altitude sensor, an outdoor temperature sensor, an indoor temperature sensor, an outdoor pressure sensor, an indoor pressure sensor, a humidity sensor, an air flow sensor, a refrigerant temperature sensor, a stack temperature sensor, and the like of the aircraft to receive detection signals. The controller may be electrically connected to the motor 11, an inverter, valves 51 to 60 and 8, the air intake fan 19, and the pump 9, and may transmit command signals for controlling operations of components thereof.

The controller may include a plurality of electrical and electronic components that provide power and operation control to the pertinent components, respectively. For example, the controller may include a memory and a microprocessor with a semiconductor chip embedded therein, and may perform various operations or instructions. The controller may control an overall operation of the apparatus for controlling temperature and pressure.

The controller may exchange various information or signals required for an operation with the corresponding component through a communication link. As a communication link, wireless communication such as a short-range communication network may be adopted, but aspects of the present disclosure are not limited to this, and wired communication, wire and wireless communication and/or optical communication may be applied to the communication link.

For example, the controller may be merged into an upper control system of the aircraft or used in combination therewith. The controller may be linked to at least one other control system, such as an air supply control system, an indoor air conditioning and temperature control system, a machine control system, a hydraulic control system, an electrical control system, a fuel cell air supply control system, and a heat management control system.

The apparatus for controlling temperature and pressure may be operated in a plurality of modes (e.g., a total of 8 modes) by enabling the controller to operate a plurality of valves.

Hereinafter, an operating method for each mode of the apparatus for controlling temperature and pressure configured as described above will be described. In explaining the operation method, detailed descriptions related to the control of the motor 11 and the inverter, the valves 51 to 60 and 8, and the air intake fan 19 by the controller may be omitted.

Each mode is described with reference to the drawings, in which a flow path of a solid line represents a flow path through which the air or refrigerant is flowing, and in the three-way valve or the four-way valve, a flow of the air or refrigerant is displayed through an open port indicated by a blank triangle.

Figure 2:
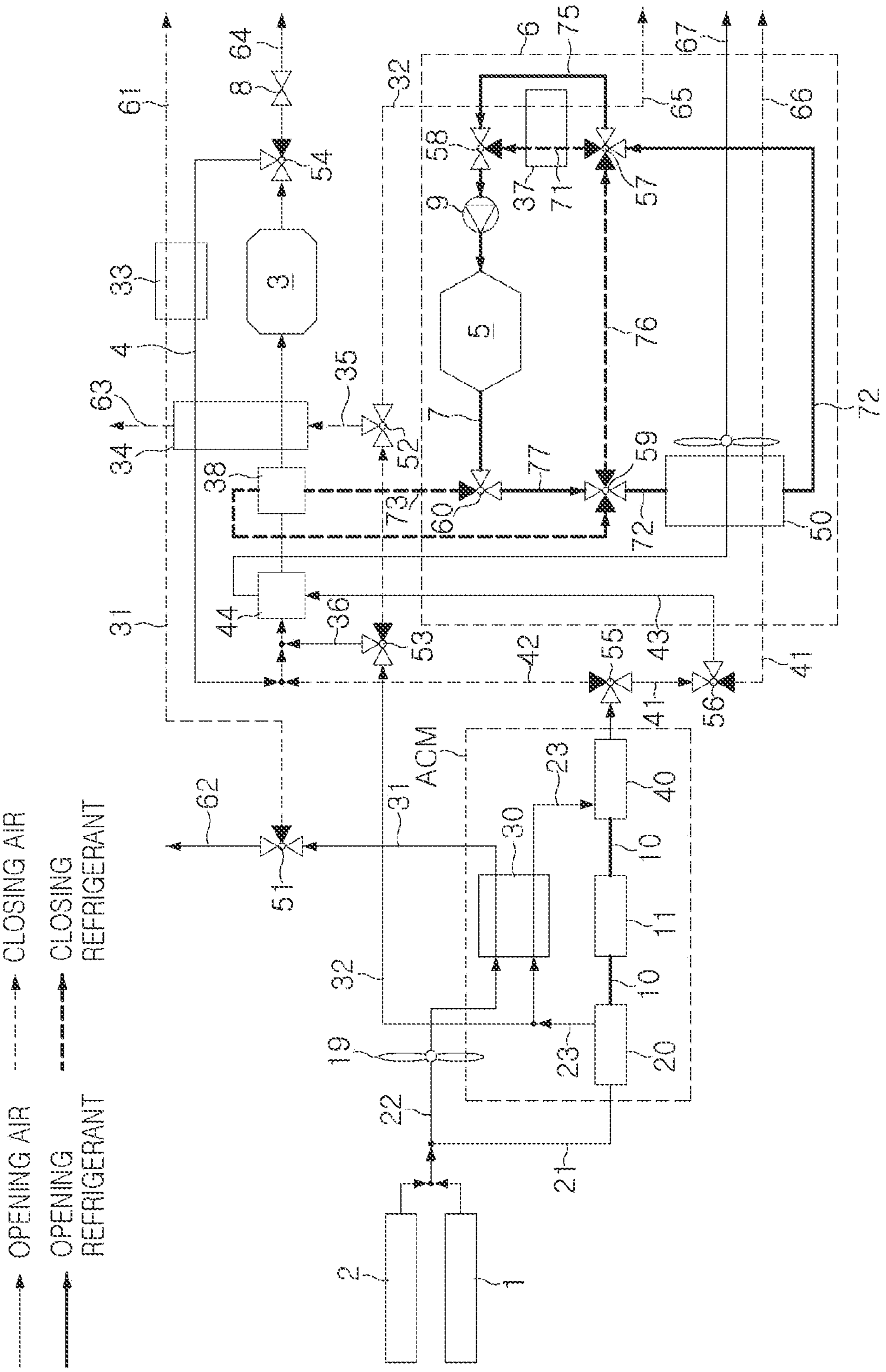
FIG. 2 is a diagram illustrating a case in which an apparatus for controlling temperature and pressure of an aircraft operates in a first mode.

FIG. 2 is a diagram illustrating a case in which an apparatus for controlling temperature and pressure of an aircraft operates in a first mode.

In the first mode, an appropriate air pressure may be applied to the interior 3, cooling or dehumidification may be performed, and a heating element of the fuel cell power train 5, such as the fuel cell stack, may be cooled.

External air may be compressed to become heated compressed air, and a portion of the heated compressed air may be supplied to the interior 3 of the aircraft before a heat exchange operation. The remaining compressed air may be heat-exchanged with the external air and may be expanded to form cooling air, and the cooling air may flow through the interior of the aircraft and may be heat-exchanged with circulating air, thus cooling the interior. The cooling air may be supplied to the heat management system 6 of the fuel cell power train 5 and may cool the refrigerant by exchanging heat with the refrigerant. Accordingly, the heating element of the fuel cell power train, for example, the fuel cell stack, may be cooled.

The external air around the aircraft may be introduced into the aircraft through the air scoops 1 and 2 and may flow to the compressor 20 along the external air line 21. The motor 11 may be driven to rotate the shaft 10. Accordingly, the compressor 20 and the turbine 40 may rotate together.

The external air may be input to the inlet of the compressor 20 and be adiabatically compressed to become heated compressed air. The compressed air may be output from the outlet of the compressor 20 and may flow to the heat exchanger 30 along the bootstrap line 23.

In the heat exchanger 30, the compressed air may be heat-exchanged with a portion of the external air that has passed through the intake air fan 19 by bypassing the compressor 20 along the introduction line 22 from the air scoops 1 and 2. Accordingly, the external air may obtain the heat from the heated compressed air to become a high-temperature external air, and the compressed air may be cooled. The high-temperature external air may be exhausted out of the aircraft through the second exhaust line 62.

The compressed air passing through the heat exchanger 30 may continue to flow to the turbine 40 along the bootstrap line 23. The compressed air may be input to the inlet of the turbine and be adiabatically expanded to become cooled cooling air. The cooling air may be output from the outlet of the turbine and may flow along the cooling line 41.

As a port at the first cooling line 42 of the fifth valve 55 is closed, the cooling air may not flow to the first cooling line 42.

As a port at the second cooling line 43 of the sixth valve 56 is opened and a port at the cooling heat exchanger 50 is closed, the cooling air may flow to the air-conditioning heat exchanger 44 along the second cooling line.

In the air-conditioning heat exchanger 44, the cooling air may be heat-exchanged with air circulating through the interior 3 and the air circulation line 4. Accordingly, since air in the interior is deprived of the heat by the cooling air to become low-temperature cooling air, it may be supplied to the interior to perform cooling and/or dehumidification in the interior.

The heat-exchanged cooling air may continue to flow to the cooling heat exchanger 50 along the second cooling line 43. Although the cooling air was heat-exchanged with the air in the interior 3, the heat-exchanged cooling air still has a temperature significantly lower than the temperature of the refrigerant passing through the fuel cell power train 5.

In the cooling heat exchanger 50, the cooling air may cool the refrigerant while exchanging the heat with a high-temperature refrigerant flowing along the refrigerant cooling line 72. Accordingly, cooling of the fuel cell power train 5 may be performed simultaneously with cooling or dehumidification in the interior 3. The cooling air may be exhausted out of the aircraft through the seventh exhaust line 67.

In the refrigerant circulation line 7 constituting the heat management system 6 of the fuel cell power train 5, operations of the seventh to tenth valves 57 to 60 may be controlled so that the third bypass line 77 bypassing the refrigerant-air heat exchanger 38, the refrigerant cooling line 72, and the first bypass line 75 bypassing the heating heat exchanger 37 may communicate with each other.

Meanwhile, some of the compressed air compressed by the compressor 20 may flow to the third valve 53 along the heating line 32 branched from the bootstrap line 23.

As a port at the heating heat exchanger 37 of the third valve 53 is closed, the compressed air may no longer flow along the heating line 32. As a port at the air circulation line 4 of the third valve 53 is opened, the compressed air heated with a predetermined pressure may be supplied to the interior 3 through the third heating line 36.

The compressed air supplied to the air circulation line 4 may (e.g., immediately) be heat-exchanged with the cooling air in the air-conditioning heat exchanger 44, as described above. Accordingly, the circulating air and the introduced compressed air in the interior 3 may be deprived of heat by the cooling air and may become low-temperature cooling air.

Accordingly, the appropriate air pressure may be applied to the interior 3 to perform cooling or dehumidification. A port at the fourth exhaust line 64 of the fourth valve 54 may be closed to recirculate air in the interior 3 along the air circulation line 4 and maintain a constant pressure. In order to prevent overpressure, the port at the fourth exhaust line 64 of the fourth valve 54 may be intermittently opened.

Figure 3:
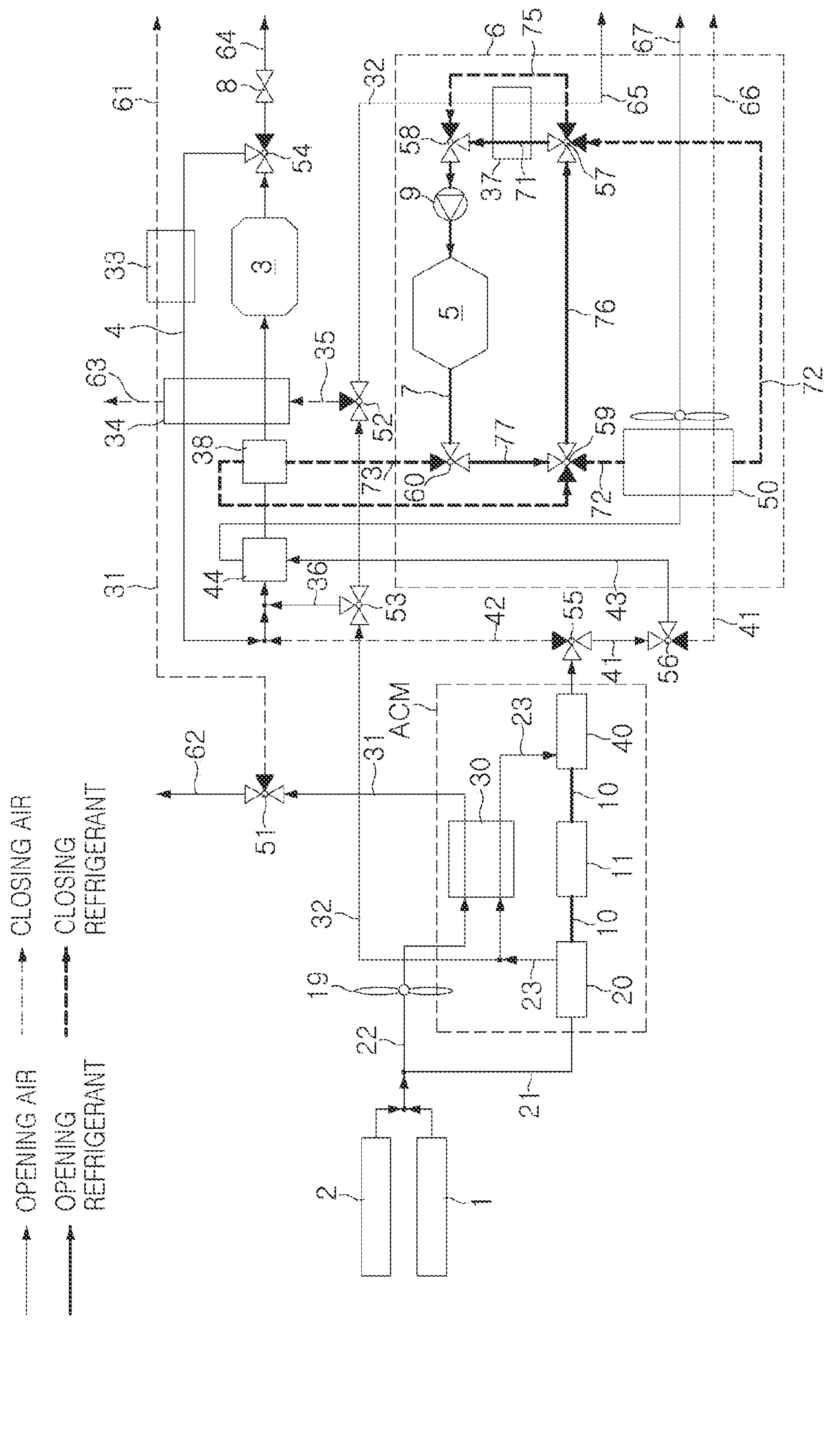
FIG. 3 is a diagram illustrating a case in which an apparatus for controlling temperature and pressure of an aircraft operates in a second mode.

FIG. 3 is a diagram illustrating a case in which an apparatus for controlling temperature and pressure of an aircraft operates in a second mode.

In the second mode, an appropriate air pressure may be applied to the interior 3 to perform dehumidification, and a temperature of the fuel cell power train 5 may be increased. The second mode may be performed in a cold environment (e.g., in winter).

The external air may be compressed to become heated compressed air, and a portion of the compressed air may be supplied to the interior 3 of the aircraft and the heat management system 6 of the fuel cell power train 5 before the heat exchange operation. The remaining compressed air may be heat-exchanged with the external air and may be expanded to form cooling air, and the cooling air may exchange heat with air flowing and circulating in the interior 3 of the aircraft to dehumidify the interior.

For example, a process in which the external air around the aircraft is introduced into the aircraft through the air scoops 1 and 2 and converted into cooling air by passing through the air cycle machine (ACM) and the cooling air flows along the cooling line 41 may be the same as described in FIG. 2.

A process in which some of the external air obtains the heat from the compressed air heated by the heat exchanger 30 to be converted into a high-temperature external air and the high-temperature external air is exhausted out of the aircraft through the second exhaust line 62 may be the same as described in FIG. 2.

As the port at the first cooling line 42 of the fifth valve 55 is closed, the cooling air may not flow to the first cooling line 42 but may flow along the cooling line 41.

As the port at the second cooling line 43 of the sixth valve 56 is opened and the port at the cooling heat exchanger 50 is closed, the cooling air may flow to the air-conditioning heat exchanger 44 along the second cooling line.

In the air-conditioning heat exchanger 44, the cooling air may be heat-exchanged with air circulating through the interior 3 and the air circulation line 4. Accordingly, because air in the interior is deprived of the heat by the cooling air and is converted into to a low-temperature cooling air, the low-temperature cooling air may be supplied to the interior to perform dehumidification in the interior.

The heat-exchanged cooling air may continue to flow to the cooling heat exchanger 50 along the second cooling line 43. The cooling air may be exhausted out of the aircraft through the seventh exhaust line 67.

In the refrigerant circulation line 7 constituting the heat management system 6 of the fuel cell power train 5, operations of the seventh to tenth valves 57 to 60 may be controlled so that the third bypass line 77 bypassing the refrigerant-air heat exchanger 38, the second bypass line 76 bypassing the cooling heat exchanger 50, and the refrigerant heating line 71 may communicate with each other.

Some of the compressed air compressed by the compressor 20 may flow to the heating heat exchanger 37 along the heating line 32 branched from the bootstrap line 23.

In the heating heat exchanger 37, the heated compressed air may be heat-exchanged with the refrigerant passing through the refrigerant heating line 71 of the refrigerant circulation line 7. Accordingly, the compressed air may transmit the heat to the refrigerant to increase an internal temperature of the heat management system 6, and may allow the fuel cell power train 5 to be stably started and operated even in low-temperature environments in winter.

The heat-exchanged compressed air may be exhausted out of the aircraft through the fifth exhaust line 65.

As the port at the air circulation line 4 of the third valve 53 is opened, the compressed air heated with a predetermined pressure may be supplied to the interior 3 by passing through the third heating line 36. As a port at the second heating line 35 of the second valve 52 is closed, the compressed air may flow to the second heating heat exchanger 34.

The compressed air supplied to the air circulation line 4 may (e.g., immediately) be heat-exchanged with the cooling air in the air-conditioning heat exchanger 44, as described above. Accordingly, the circulating air and the introduced compressed air in the interior 3 may be deprived of the heat by the cooling air and may be converted to a low-temperature cooling air.

Accordingly, the appropriate air pressure may be applied to the interior 3 to perform dehumidification. As the port at the fourth exhaust line 64 of the fourth valve 54 is closed, air in the interior may be recirculated along the air circulation line 4 and a constant pressure may be maintained. In order to prevent overpressure, the port at the fourth exhaust line 64 of the fourth valve may be intermittently opened.

Figure 4:
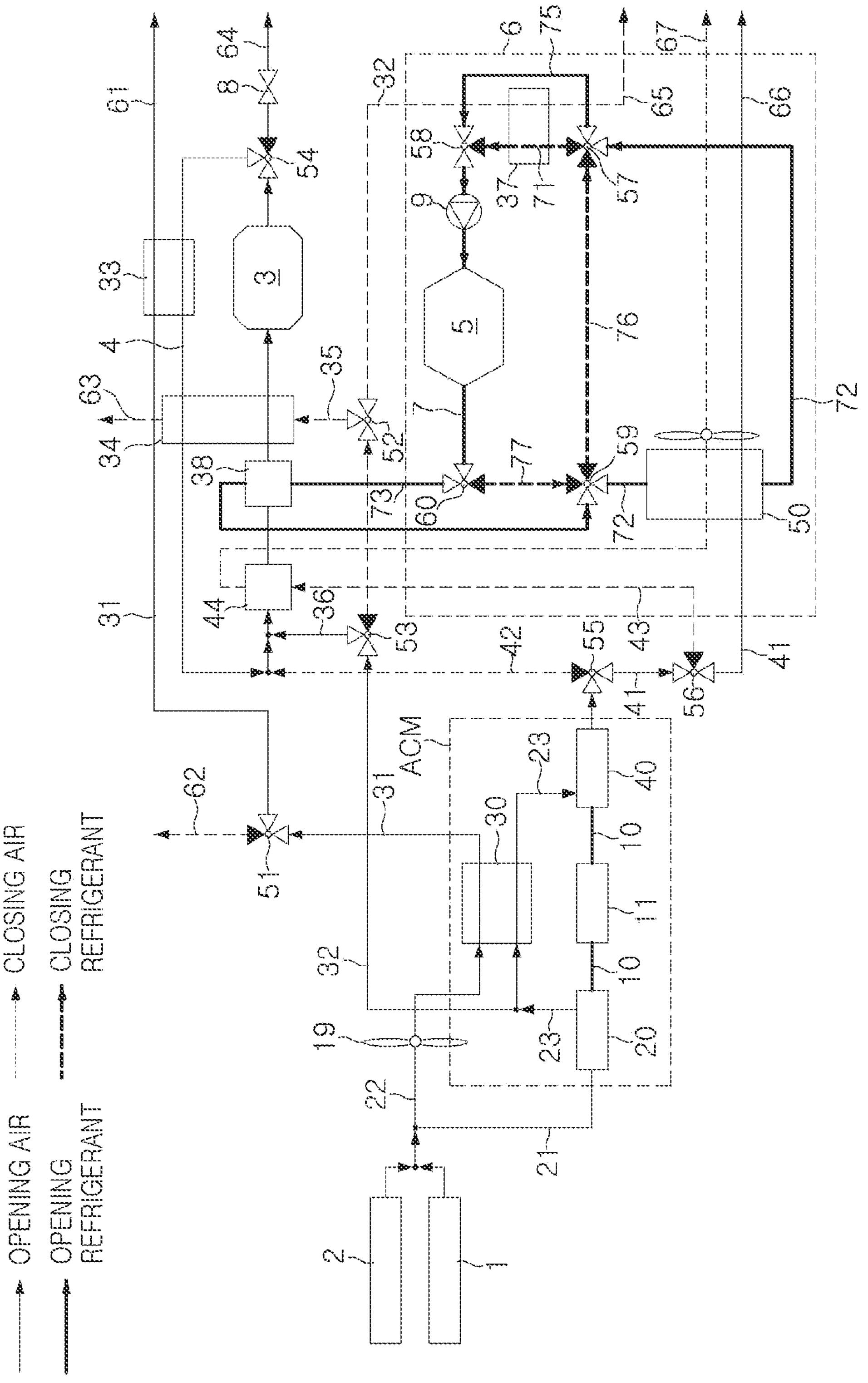
FIG. 4 is a diagram illustrating a case in which an apparatus for controlling temperature and pressure of an aircraft operates in a third mode.

FIG. 4 is a diagram illustrating a case in which an apparatus for controlling temperature and pressure of an aircraft operates in a third mode.

In the third mode, an appropriate air pressure may be applied to the interior 3 and heating may be performed, and the heating element of the fuel cell power train 5, such as the fuel cell stack, may be cooled.

The external air may be compressed to become heated compressed air, and a portion of the compressed air may be supplied to the interior 3 of the aircraft before the heat exchange operation. The remaining compressed air may be heat-exchanged with the external air and may be expanded to form cooling air, and the cooling air may be supplied to the heat management system 6 of the fuel cell power train 5 and may cool the refrigerant by exchanging heat with the refrigerant. The refrigerant heated through the fuel cell power train may heat the interior by exchanging heat with air flowing into the interior.

For example, a process in which the external air around the aircraft is introduced into the aircraft through the air scoops 1 and 2 and converted into cooling air by passing through the air cycle machine (ACM) and the cooling air flows along the cooling line 41 may be the same as described in FIG. 2.

Some of the external air may obtain the heat from the compressed air heated in the heat exchanger 30 to become a high-temperature external air, and a port at the second exhaust line 62 of the first valve 51 may be closed, thus allowing the high-temperature external air to flow to the first heating heat exchanger 33 along the first heating line 31.

In the first heating heat exchanger 33, the heated compressed air may be heat-exchanged with air passing through the air circulation line 4. Accordingly, the air in the interior 3 may obtain the heat from the compressed air and become high-temperature heating air, and the high-temperature heating air may be supplied to the interior to perform heating in the interior.

The heat-exchanged compressed air may be exhausted out of the aircraft through the first exhaust line 61.

As the port at the first cooling line 42 of the fifth valve 55 is closed, the cooling air may not flow to the first cooling line and may flow along the cooling line 41.

Because the port at the second cooling line 43 of the sixth valve 56 is closed and the port at the cooling heat exchanger 50 is opened, the cooling air can flow to the cooling heat exchanger 50 along the cooling line 41.

In the cooling heat exchanger 50, the cooling air may cool the refrigerant while exchanging the heat with the high-temperature refrigerant flowing along the refrigerant cooling line 72. Accordingly, the cooling of the fuel cell power train 5 may be performed. The cooling air may be exhausted out of the aircraft through the sixth exhaust line 66.

In the refrigerant circulation line 7 constituting the heat management system 6 of the fuel cell power train 5, operations of the seventh to tenth valves 57 to 60 may be controlled so that the fourth heating line 73, the refrigerant cooling line 72, and the first bypass line 75 bypassing the heating heat exchanger 37 may communicate with each other.

The refrigerant heated by passing through the fuel cell power train 5 may flow to the refrigerant-air heat exchanger 38 along the fourth heating line 73.

In the refrigerant-air heat exchanger 38, the heated refrigerant may be heat-exchanged with the air passing through the air circulation line 4. Accordingly, the air in the interior 3 may obtain the heat from the refrigerant of the fuel cell power train 5 to become high-temperature heating air, and the high-temperature heating air may be supplied to the interior to perform additional heating in the interior.

Meanwhile, some of the compressed air compressed by the compressor 20 may flow to the third valve 53 along the heating line 32 branched from the bootstrap line 23.

As the port at the heating heat exchanger 37 of the third valve 53 is closed, the compressed air may no longer flow along the heating line 32. As the port at the air circulation line 4 of the third valve 53 is opened, the compressed air heated with a predetermined pressure may be supplied to the interior 3 through the third heating line 36.

The compressed air supplied to the air circulation line 4 may be heat-exchanged with the refrigerant heated in the refrigerant-air heat exchanger 38 as described above. Accordingly, the circulating air and the introduced compressed air in the interior 3 may obtain the heat from the refrigerant and become high-temperature heating air.

Accordingly, the appropriate air pressure may be applied to the interior 3 to perform the heating. As the port at the fourth exhaust line 64 of the fourth valve 54 is closed, air in the interior may be recirculated along the air circulation line 4 and a constant pressure may be maintained. In order to prevent overpressure, the port at the fourth exhaust line 64 of the fourth valve 54 may be intermittently opened.

Figure 5:
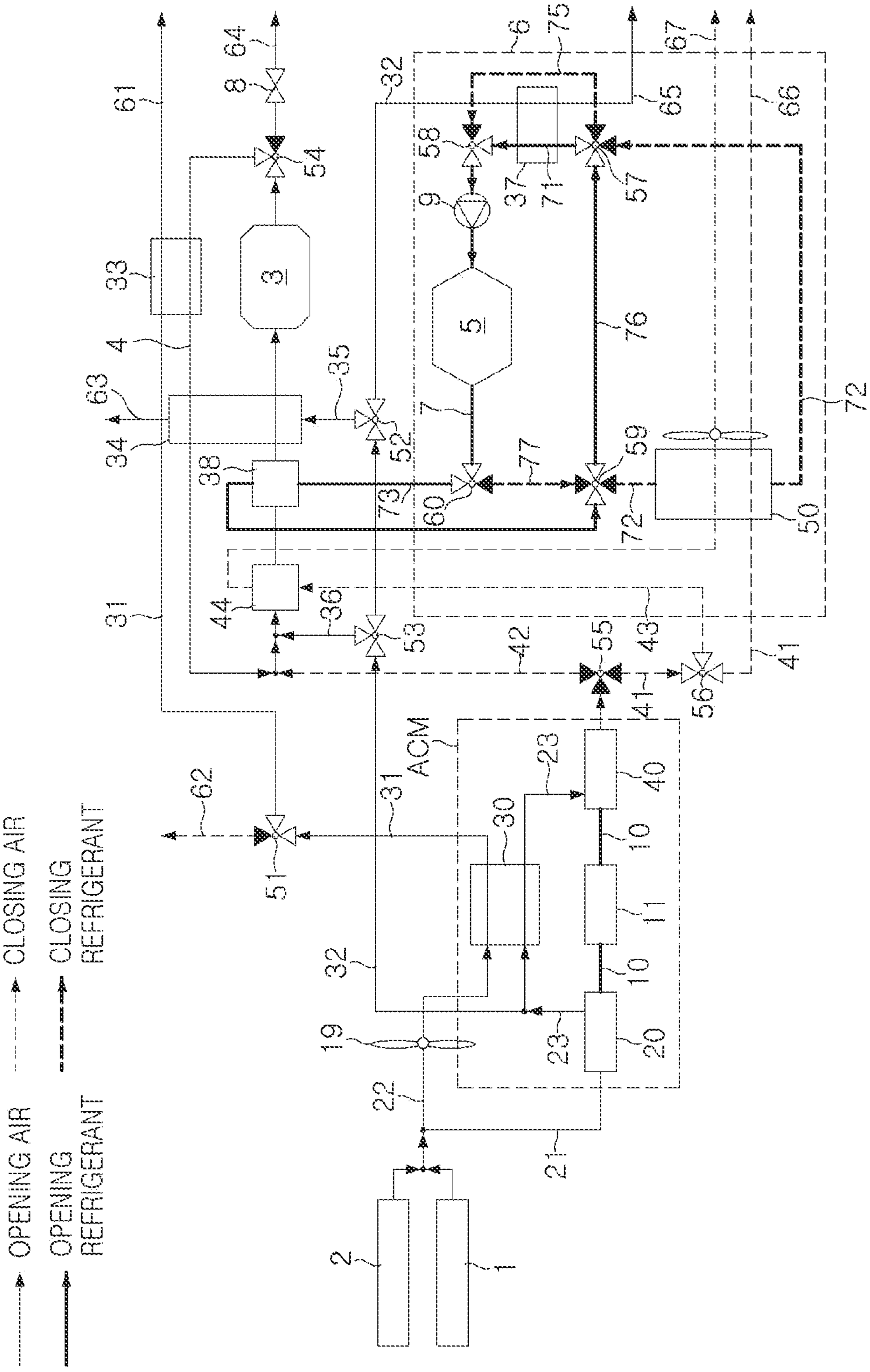
FIG. 5 is a diagram illustrating a case in which an apparatus for controlling temperature and pressure of an aircraft operates in a fourth mode.

FIG. 5 is a diagram illustrating a case in which an apparatus for controlling temperature and pressure of an aircraft operates in a fourth mode.

In the fourth mode, an appropriate air pressure may be applied to the interior 3 to perform the heating, and the fuel cell power train 5 may be heated. The fourth mode may be performed in winter.

The external air may be compressed to become heated compressed air, and a portion of the compressed air may be supplied to the interior 3 of the aircraft and the heat management system 6 of the fuel cell power train 5 before the heat exchange operation. The remaining compressed air may be heat-exchanged with the external air and may be expanded to form cooling air. The refrigerant heated through the fuel cell power train 5 may heat the interior by exchanging the heat with air flowing into the interior.

For example, a process in which the external air around the aircraft is introduced into the aircraft through the air scoops 1 and 2 and converted into cooling air by passing through the air cycle machine (ACM) may be the same as described in FIG. 2. However, because all ports of the fifth valve 55 are closed, the cooling air may not flow to the cooling line 41 as well as the first cooling line 42.

Some of the external air may obtain the heat from the compressed air heated from the heat exchanger 30 to become a high-temperature external air, and the port at the second exhaust line 62 of the first valve 51 may be closed, thus allowing the high-temperature external air to flow to the first heating heat exchanger 33 along the first heating line 31.

In the first heating heat exchanger 33, the heated compressed air may be heat-exchanged with the air passing through the air circulation line 4. Accordingly, the air in the interior 3 may obtain the heat from the compressed air and become the high-temperature heating air, and the high-temperature heating air may be supplied to the interior to perform heating in the interior.

The heat-exchanged compressed air may be exhausted out of the aircraft through the first exhaust line 61.

In the refrigerant circulation line 7 constituting the heat management system 6 of the fuel cell power train 5, operations of the seventh to tenth valves 57 to 60 may be controlled so that the fourth heating line 73, the second bypass line 76 bypassing the cooling heat exchanger 50, and the refrigerant heating line 71 may communicate with each other.

The refrigerant heated by passing through the fuel cell power train 5 may flow to the refrigerant-air heat exchanger 38 along the fourth heating line 73.

In the refrigerant-air heat exchanger 38, the heated refrigerant may be heat-exchanged with the air passing through the air circulation line 4. Accordingly, the air in the interior 3 may obtain the heat from the refrigerant of the fuel cell power train 5 to become high-temperature heating air, and the high-temperature heating air may be supplied to the interior to perform additional heating in the interior.

Some of the compressed air compressed by the compressor 20 may flow to the heating heat exchanger 37 along the heating line 32 branched from the bootstrap line 23.

In the heating heat exchanger 37, the heated compressed air may be heat-exchanged with the refrigerant passing through the refrigerant heating line 71 of the refrigerant circulation line 7. Accordingly, the compressed air may transmit the heat to the refrigerant to increase the internal temperature of the heat management system 6, and may allow the fuel cell power train 5 to be stably started and operated even in low-temperature environments (e.g., in winter).

The heat-exchanged compressed air may be exhausted out of the aircraft through the fifth exhaust line 65.

As the port at the air circulation line 4 of the third valve 53 is opened, the compressed air heated with a predetermined pressure may be supplied to the interior 3 through the third heating line 36. As the port at the second heating line 35 of the second valve 52 is opened, the heated compressed air may flow to the second heating heat exchanger 34.

The compressed air supplied to the air circulation line 4 may be heat-exchanged with the refrigerant heated in the refrigerant-air heat exchanger 38, as described above. Accordingly, the circulating air and the introduced compressed air in the interior 3 may obtain the heat from the refrigerant and become high-temperature heating air.

In the second heating heat exchanger 34 disposed between the second heating line 35 and the air circulation line 4 in the interior 3, the heated compressed air may be heat-exchanged with the air passing through the air circulation line 4. Accordingly, the air in the interior 3 may obtain the heat from the compressed air and become the high-temperature heating air, and the high-temperature heating air may be supplied to the interior to perform additional heating in the interior.

Accordingly, the appropriate air pressure may be applied to the interior 3 to perform the heating. As the port at the fourth exhaust line 64 of the fourth valve 54 is closed, air in the interior may be recirculated along the air circulation line 4 and a constant pressure may be maintained. In order to prevent overpressure, the port at the fourth exhaust line 64 of the fourth valve may be intermittently opened.

Figure 6:
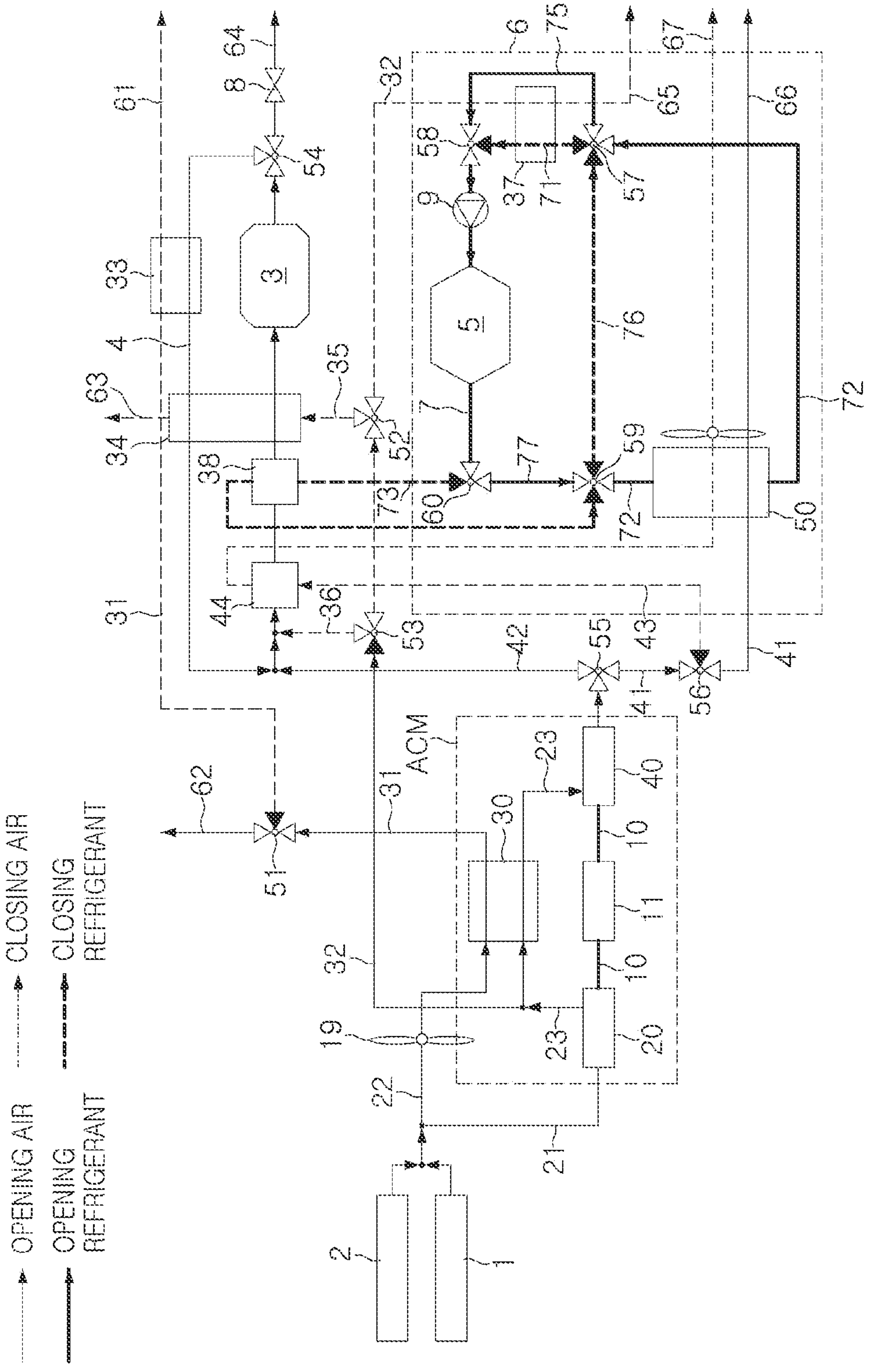
FIG. 6 is a diagram illustrating a case in which an apparatus for controlling temperature and pressure of an aircraft operates in a fifth mode.

FIG. 6 is a diagram illustrating a case in which an apparatus for controlling temperature and pressure of an aircraft operates in a fifth mode.

In the fifth mode, the cooling or dehumidification may be performed in the interior 3 without pressurization of air pressure, and the heating element of the fuel cell power train 5, such as the fuel cell stack, may be cooled.

The external air may be compressed to become heated compressed air, and the compressed air may be heat-exchanged with the external air and may be expanded to form cooling air, and a portion of the cooling air may be supplied to the interior 3 of the aircraft to cool or dehumidify the interior. The remaining cooling air may be supplied to the heat management system 6 of the fuel cell power train 5 and may cool the refrigerant by exchanging the heat with the refrigerant.

For example, a process in which the external air around the aircraft is introduced into the aircraft through the air scoops 1 and 2 and converted into cooling air by passing through the air cycle machine (ACM) and the cooling air flows along the cooling line 41 may be the same as described in FIG. 2.

A process in which some of the external air obtains the heat from the compressed air heated by the heat exchanger 30 to become a high-temperature external air and the high-temperature external air is exhausted out of the aircraft through the second exhaust line 62 may be the same as described in FIG. 2.

As the port at the first cooling line 42 of the fifth valve 55 is opened, the cooling air may be supplied to the interior 3 through the first cooling line 42. Accordingly, the circulating air in the interior may become a low-temperature cooling air.

Accordingly, cooling or dehumidification in the interior 3 may be performed. Because all ports of the fourth valve 54 are opened, air in the interior may be recirculated or exhausted along the air circulation line 4. In order to maintain the pressure, the pressure control valve 8 may be selectively and at least partially opened and closed if necessary. The air may be exhausted out of the aircraft through the fourth exhaust line 64.

As the port at the second cooling line 43 of the sixth valve 56 is closed and the port at the cooling heat exchanger 50 is opened, the cooling air may flow to the cooling heat exchanger along the cooling line 41.

In the cooling heat exchanger 50, the cooling air may cool the refrigerant while exchanging the heat with the high-temperature refrigerant flowing along the refrigerant cooling line 72. Accordingly, cooling of the fuel cell power train 5 may be performed. The cooling air may be exhausted out of the aircraft through the sixth exhaust line 66.

In the refrigerant circulation line 7 constituting the heat management system 6 of the fuel cell power train 5, operations of the seventh to tenth valves 57 to 60 may be controlled so that the third bypass line 77 bypassing the refrigerant-air heat exchanger 38, the refrigerant cooling line 72, and the first bypass line 75 bypassing the heating heat exchanger 37 may communicate with each other.

Some of the compressed air compressed by the compressor 20 may flow to the third valve 53 along the heating line 32 branched from the bootstrap line 23. In this case, because all ports of the third valve 53 are closed, the compressed air may no longer flow.

Figure 7:
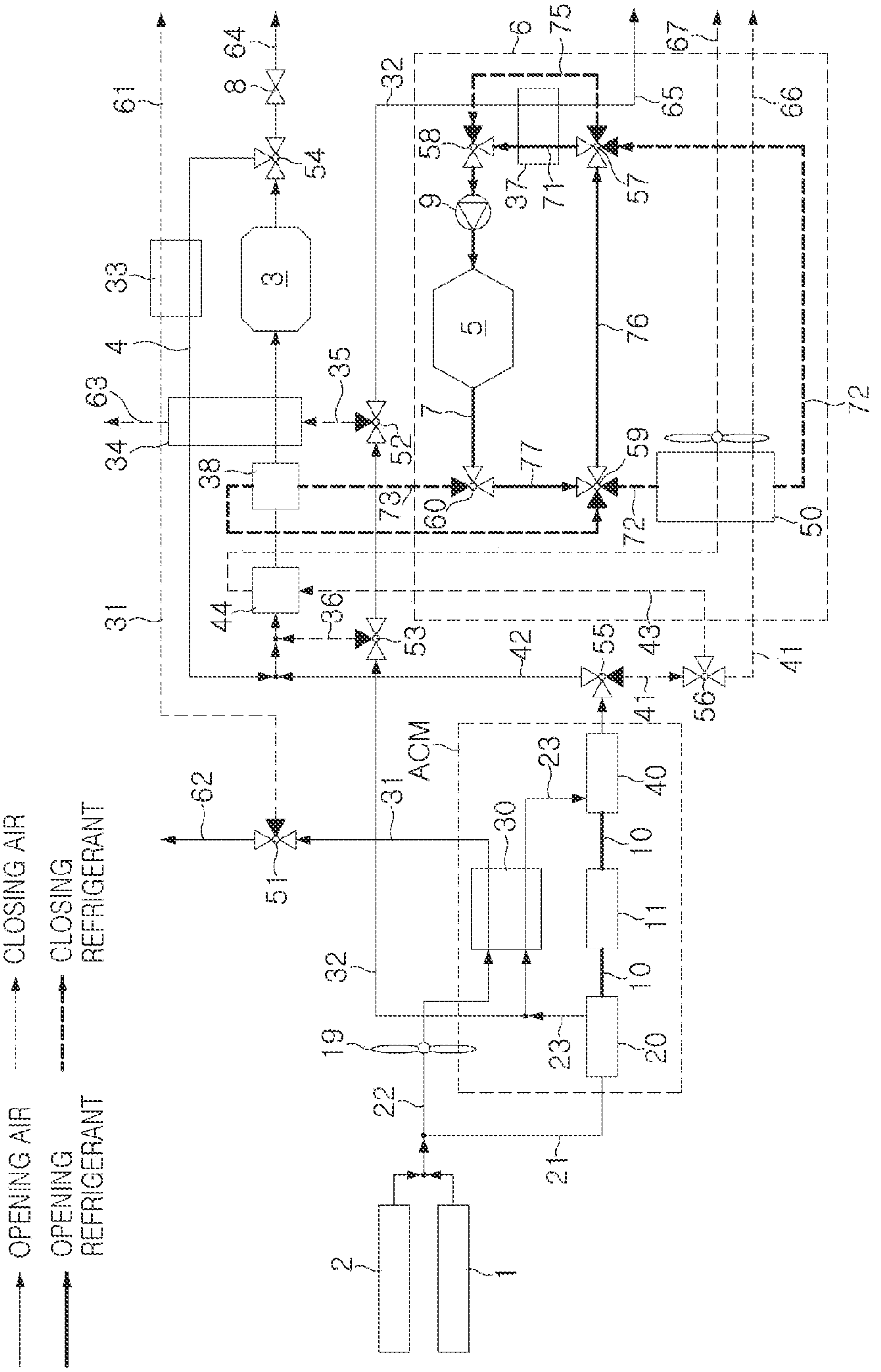
FIG. 7 is a diagram illustrating a case in which an apparatus for controlling temperature and pressure of an aircraft operates in a sixth mode.

FIG. 7 is a diagram illustrating a case in which an apparatus for controlling temperature and pressure of an aircraft operates in a sixth mode.

In the sixth mode, dehumidification may be performed in the interior 3 without pressurization of air pressure, and the temperature of the fuel cell power train 5 may be increased. The sixth mode may be performed in low-temperature environments (e.g., in winter).

The external air may be compressed to become heated compressed air, and a portion of the compressed air may be supplied to the heat management system 6 of the fuel cell power train 5 before the heat exchange operation. The remaining compressed air may be heat-exchanged with the external air and may be expanded to form cooling air, and the cooling air may be supplied to the interior 3 of the aircraft to dehumidify the interior.

For example, a process in which the external air around the aircraft is introduced into the aircraft through the air scoops 1 and 2 and converted into cooling air by passing through the air cycle machine (ACM) may be the same as described in FIG. 2. However, as a port at the cooling line 41 of the fifth valve 55 is closed, the cooling air may not flow to the cooling line and may flow along the first cooling line 42.

A process in which some of the external air obtains the heat from the compressed air heated by the heat exchanger 30 to become a high-temperature external air and the high-temperature external air is exhausted out of the aircraft through the second exhaust line 62 may be the same as described in FIG. 2.

Because the port at the first cooling line 42 of the fifth valve 55 is opened, the cooling air may be supplied to the interior 3 through the first cooling line. Accordingly, the circulating air in the interior may become a low-temperature cooling air.

Accordingly, dehumidification in the interior may be performed. Because all ports of the fourth valve 54 are opened, air in the interior may be recirculated or exhausted along the air circulation line 4. In order to maintain the pressure, the pressure control valve 8 may be selectively and at least partially opened and closed if necessary. The air may be exhausted out of the aircraft through the fourth exhaust line 64.

Some of the compressed air compressed by the compressor 20 may flow to the heating heat exchanger 37 along the heating line 32 branched from the bootstrap line 23.

In the heating heat exchanger 37, the heated compressed air may be heat-exchanged with the refrigerant passing through the refrigerant heating line 71 of the refrigerant circulation line 7. Accordingly, the compressed air may transmit the heat to the refrigerant to increase the internal temperature of the heat management system 6, and may allow the fuel cell power train 5 to be stably started and operated even in low-temperature environments in winter.

The heat-exchanged compressed air may be exhausted out of the aircraft through the fifth exhaust line 65.

The port at the air circulation line 4 of the third valve 53 of the heating line 32 may be closed, and the port at the second heating line 35 of the second valve 52 may be closed.

In the refrigerant circulation line 7 constituting the heat management system 6 of the fuel cell power train 5, operations of the seventh to tenth valves 57 to 60 may be controlled so that the third bypass line 77 bypassing the refrigerant-air heat exchanger 38, the second bypass line 76 bypassing the cooling heat exchanger 50, and the refrigerant heating line 71 may communicate with each other.

Figure 8:
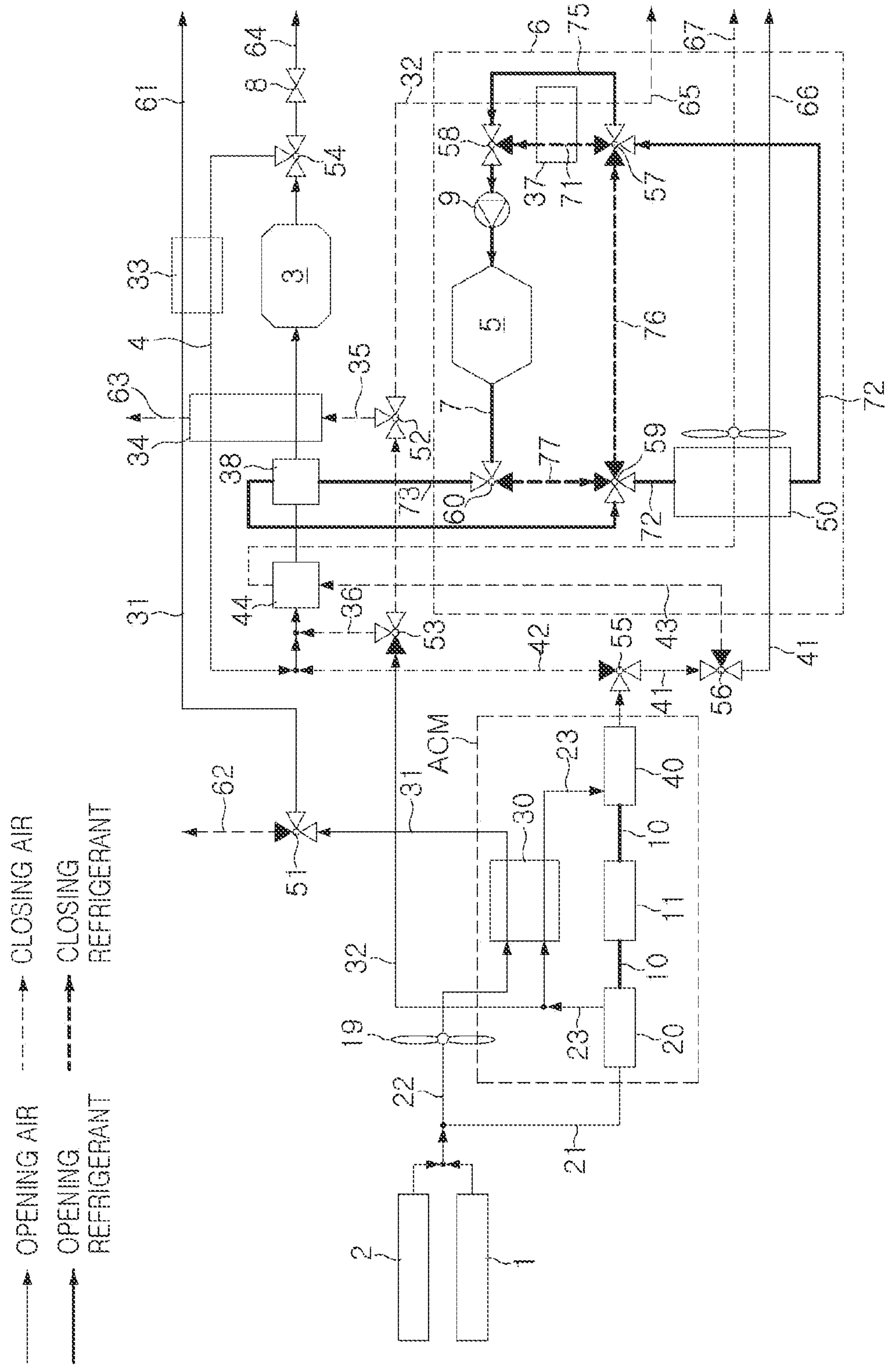
FIG. 8 is a diagram illustrating a case in which an apparatus for controlling temperature and pressure of an aircraft operates in a seventh mode.

FIG. 8 is a diagram illustrating a case in which an apparatus for controlling temperature and pressure of an aircraft operates in a seventh mode.

In the seventh mode, the heating may be performed in the interior 3 without pressurization of air pressure, and the heating element of the fuel cell power train 5, such as the fuel cell stack, may be cooled.

The external air may be compressed to become heated compressed air, and the compressed air may be heat-exchanged with the external air and may be expanded to form cooling air, and the cooling air may be supplied to the heat management system 6 of the fuel cell power train 5 and may cool the refrigerant by exchange the heat with the refrigerant. The refrigerant heated by passing through the fuel cell power train may heat the interior by exchanging the heat with the air flowing into the interior 3.

For example, a process in which the external air around the aircraft is introduced into the aircraft through the air scoops 1 and 2 and converted into cooling air by passing through the air cycle machine (ACM) and the cooling air flows along the cooling line 41 may be the same as described in FIG. 2.

Some of the external air may obtain the heat from the compressed air heated from the heat exchanger 30 to become a high-temperature external air, and the port at the second exhaust line 62 of the first valve 51 may be closed, thus allowing the high-temperature external air to flow to the first heating heat exchanger 33 along the first heating line 31.

In the first heating heat exchanger 33, the heated compressed air may be heat-exchanged with the air passing through the air circulation line 4. Accordingly, the air in the interior 3 may obtain the heat from the compressed air and become high-temperature heating air, and the high-temperature heating air may be supplied to the interior to perform heating in the interior.

The heat-exchanged compressed air may be exhausted out of the aircraft through the first exhaust line 61.

As the port at the first cooling line 42 of the fifth valve 55 is closed, the cooling air may not flow to the first cooling line and may flow along the cooling line 41.

As the port at the second cooling line 43 of the sixth valve 56 is closed and the port at the cooling heat exchanger 50 is opened, the cooling air may flow to the cooling heat exchanger along the cooling line 41.

In the cooling heat exchanger 50, the cooling air may cool the refrigerant while exchanging the heat with the high-temperature refrigerant flowing along the refrigerant cooling line 72. Accordingly, cooling of the fuel cell power train 5 may be performed. The cooling air may be exhausted out of the aircraft through the sixth exhaust line 66.

In the refrigerant circulation line 7 constituting the heat management system 6 of the fuel cell power train 5, operations of the seventh to tenth valves 57 to 60 may be controlled so that the fourth heating line 73, the refrigerant cooling line 72, and the first bypass line 75 bypassing the heating heat exchanger 37 may communicate with each other.

The refrigerant heated through the fuel cell power train 5 may flow to the refrigerant-air heat exchanger 38 along the fourth heating line 73.

In the refrigerant-air heat exchanger 38, the heated refrigerant may be heat-exchanged with the air passing through the air circulation line 4. Accordingly, the air in the interior 3 may obtain the heat from the refrigerant of the fuel cell power train 5 to become high-temperature heating air, and the high-temperature heating air may be supplied to the interior to perform additional heating in the interior.

Accordingly, heating in the interior 3 may be performed. As all ports of the fourth valve 54 are opened, air in the interior may be recirculated or exhausted along the air circulation line 4. In order to maintain the pressure, the pressure control valve 8 may be selectively and at least partially opened and closed if necessary. The air may be exhausted out of the aircraft through the fourth exhaust line 64.

Some of the compressed air compressed by the compressor 20 may flow to the third valve 53 along the heating line 32 branched from the bootstrap line 23. In this case, as all ports of the third valve 53 are closed, the compressed air may no longer flow.

Figure 9:
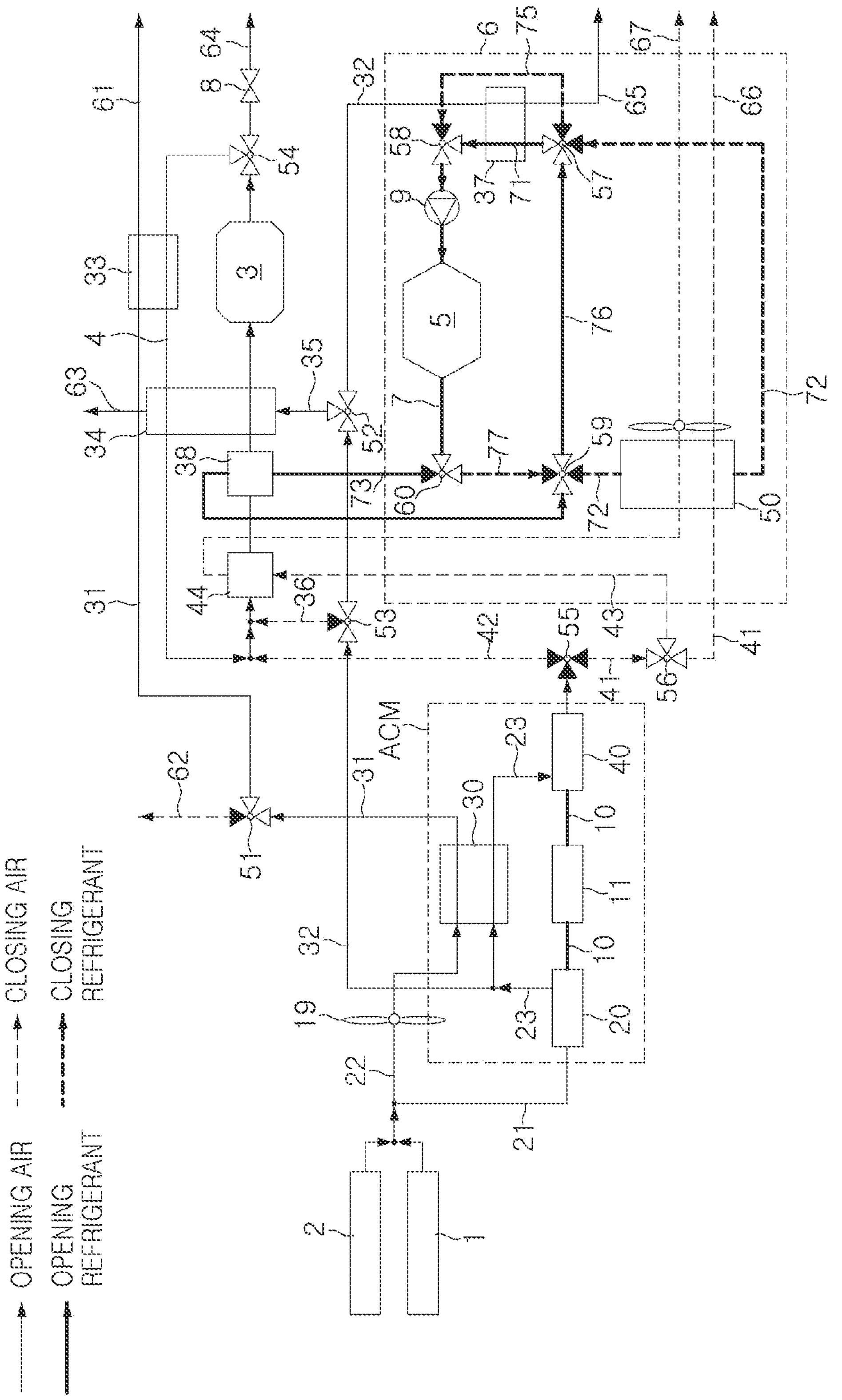
FIG. 9 is a diagram illustrating a case in which an apparatus for controlling temperature and pressure of an aircraft operates in an eighth mode.

FIG. 9 is a diagram illustrating a case in which an apparatus for controlling temperature and pressure of an aircraft operates in an eighth mode.

In the eighth mode, the heating may be performed in the interior 3 without pressurization of air pressure, and the temperature of the fuel cell power train 5 may be increased. The eighth mode may be performed in low-temperature environments (e.g., in winter).

The external air may be compressed to become heated compressed air, and a portion of the compressed air may be supplied to the heat management system 6 of the fuel cell power train 5 before the heat exchange operation. The remaining compressed air may be heat-exchanged with the external air and may be expanded to form cooling air. The refrigerant heated by passing through the fuel cell power train may heat the interior by exchanging the heat with the air flowing into the interior 3.

For example, a process in which the external air around the aircraft is introduced into the aircraft through the air scoops 1 and 2 and converted into cooling air by passing through the air cycle machine (ACM) may be the same as described in FIG. 2. However, because all ports of the fifth valve 55 are closed, the cooling air may not flow to the cooling line 41 as well as the first cooling line 42.

Some of the external air may obtain the heat from compressed air heated from the heat exchanger 30 to become a high-temperature external air, and the port at the second exhaust line 62 of the first valve 51 may be closed, thus allowing the high-temperature external air to flow to the first heating heat exchanger 33 along the first heating line 31.

In the first heating heat exchanger 33, the heated compressed air may be heat-exchanged with the air passing through the air circulation line 4. Accordingly, the air in the interior 3 may obtain the heat from the compressed air and become the high-temperature heating air, and the high-temperature heating air may be supplied to the interior to perform heating in the interior.

The heat-exchanged compressed air may be exhausted out of the aircraft through the first exhaust line 61.

In the refrigerant circulation line 7 constituting the heat management system 6 of the fuel cell power train 5, operations of the seventh to tenth valves 57 to 60 may be controlled so that the fourth heating line 73, the second bypass line 76 bypassing the cooling heat exchanger 50, and the refrigerant heating line 71 may communicate with each other.

The refrigerant heated through the fuel cell power train 5 may flow to the refrigerant-air heat exchanger 38 along the fourth heating line 73.

In the refrigerant-air heat exchanger 38, the heated refrigerant may be heat-exchanged with the air passing through the air circulation line 4. Accordingly, the air in the interior 3 may obtain the heat from the refrigerant of the fuel cell power train 5 to become high-temperature heating air, and the high-temperature heating air may be supplied to the interior to perform additional heating in the interior.

Accordingly, heating in the interior 3 may be performed. Because all ports of the fourth valve 54 are opened, air in the interior may be recirculated or exhausted along the air circulation line 4. In order to maintain the pressure, the pressure control valve 8 may be selectively and at least partially opened and closed if necessary. The air may be exhausted out of the aircraft through the fourth exhaust line 64.

Some of the compressed air compressed by the compressor 20 may flow to the heating heat exchanger 37 along the heating line 32 branched from the bootstrap line 23.

In the heating heat exchanger 37, the heated compressed air may be heat-exchanged with the refrigerant passing through the refrigerant heating line 71 of the refrigerant circulation line 7. Accordingly, the compressed air may transmit the heat to the refrigerant to increase the internal temperature of the heat management system 6, and may allow the fuel cell power train 5 to be stably started and operated even in low-temperature environments (e.g., in winter).

The heat-exchanged compressed air may be exhausted out of the aircraft through the fifth exhaust line 65.

The port at the air circulation line 4 of the third valve 53 in the heating line 32 may be closed, and the port at the second heating line 35 of the second valve 52 may be opened.

In the second heating heat exchanger 34 disposed between the second heating line 35 and the air circulation line 4 in the interior 3, the heated compressed air may be heat-exchanged with air passing through the air circulation line. Accordingly, the air in the interior 3 may obtain the heat from the compressed air and become high-temperature heating air, and the high-temperature heating air may be supplied to the interior to perform additional heating in the interior.

According to the apparatus for controlling temperature and pressure, the external air may be appropriately used as a working fluid in, for example, an electric propulsion aircraft without an engine, and accordingly, in addition to control of the air conditioning in the interior, the heated compressed air may be supplied to the fuel cell power train, or a power train and avionics equipment may be cooled.

According to the apparatus for controlling temperature and pressure, the air cycle machine and the heat management system for the fuel cell power train may be continuously operated on the ground, and the power consumption for heating the aircraft may be reduced in low-temperature environments (e.g., in winter), thereby assisting in an increase of the operating distance of the aircraft.

The aforementioned description merely illustrates the technical concept of the present disclosure, and a person skilled in the art to which the present disclosure pertains may make various modifications and modifications without departing from the essential characteristics of the present disclosure.

Therefore, the examples disclosed in this specification and drawings are not intended to limit but to explain the technical concept of the present disclosure, and the scope of the technical idea of the present disclosure is not limited by these examples. The scope of protection of the present disclosure should be interpreted by the following claims, and all technical ideas within the scope equivalent thereto should be interpreted as being included in the scope of the present disclosure.

What is claimed is:

1. An apparatus comprising:

a shaft installed in an aircraft, the shaft being rotatable by having a motor coupled thereto;

a compressor, rotatable by being connected to the shaft, configured to form a flow of heated compressed air by compressing a first portion of external air introduced into the aircraft;

a heat exchanger configured to heat-exchange the heated compressed air with a second portion of external air introduced into the aircraft;

a turbine, rotatable by being connected to the shaft, configured to form a flow of cooling air by expanding the heat-exchanged compressed air;

a fuel cell power train installed in the aircraft and having a refrigerant configured to cool the fuel cell power train; and a cooling heat exchanger configured to exchange heat between the cooling air and the refrigerant as the refrigerant passes through the cooling heat exchanger, wherein the cooling air cools the refrigerant in the cooling heat exchanger, and the refrigerant circulates through the fuel cell power train, wherein the aircraft comprises:

a first air scoop through which external air is introduced; and a second air scoop through which external air is introduced, wherein the apparatus further comprises:

an external air line configured to form a first flow path for the first portion of the external air from the first air scoop and the second air scoop to the compressor;

an introduction line branched from the external air line and configured to form a second flow path for the second portion of external air from the first air scoop and the second air scoop to the heat exchanger; and an air intake fan installed in the introduction line.

2. The apparatus according to claim 1, wherein:

the external air of the second air scoop is ram air.

3. The apparatus according to claim 1, wherein:

an air circulation line for circulating air is disposed in an interior of the aircraft, a first heating line is connected to the introduction line downstream of the heat exchanger, and a first heating heat exchanger is disposed between the first heating line and the air circulation line, and heat from the external air in the first heating line is transmitted from the first heating heat exchanger to air in the air circulation line to perform heating in the interior.

4. The apparatus according to claim 1, further comprising:

a bootstrap line configured to communicate an outlet of the compressor with an inlet of the turbine, and having the heat exchanger disposed in the bootstrap line; and a heating line branched from the bootstrap line and configured to supply heated compressed air flowing from the outlet of the compressor to an air circulation line for circulating air in an interior of the aircraft.

5. The apparatus according to claim 4, wherein:

a second heating line is connected to the heating line, and a second heating heat exchanger is disposed between the second heating line and the air circulation line, and heat from the heated compressed air flowing through the heating line is selectively transmitted from the second heating heat exchanger to air in the air circulation line to perform heating in the interior.

6. The apparatus according to claim 4, wherein a third heating line is connected between the heating line and the air circulation line, and the heated compressed air is selectively directly supplied to the air circulation line.

7. The apparatus according to claim 6, wherein when the heated compressed air is supplied to the third heating line and air is circulated without exhaust in the air circulation line, the interior is configured to be pressurized.

8. The apparatus according to claim 4, further comprising:

a refrigerant circulation line configured to circulate the refrigerant, wherein a heating heat exchanger is disposed between the heating line and the refrigerant circulation line, and heat from the heated compressed air flowing through the heating line is selectively transmitted from the heating heat exchanger to the refrigerant to increase a temperature of the fuel cell power train.

9. An apparatus comprising:

a shaft installed in an aircraft, the shaft being rotatable by having a motor coupled thereto;

a compressor, rotatable by being connected to the shaft, configured to form a flow of heated compressed air by compressing a first portion of external air introduced into the aircraft;

a heat exchanger configured to heat-exchange the heated compressed air with a second portion of external air introduced into the aircraft;

a turbine, rotatable by being connected to the shaft, configured to form a flow of cooling air by expanding the heat-exchanged compressed air;

a cooling heat exchanger configured to exchange heat between a refrigerant, in the cooling heat exchanger, and the cooling air, wherein the cooling air cools the refrigerant in the cooling heat exchanger, and the refrigerant circulates through a fuel cell power train to cool the fuel cell power train in the aircraft; and a cooling line connected to an outlet of the turbine, through which cooling air flowing from the outlet of the turbine flows, wherein the cooling heat exchanger is disposed between the cooling line and a refrigerant circulation line for circulating the refrigerant, wherein a heated refrigerant flowing through the refrigerant circulation line is selectively cooled by the cooling air in the cooling heat exchanger, wherein a first cooling line is connected between an air circulation line and the cooling line, wherein the air circulation line is configured to circulate air in an interior of the aircraft, and wherein the cooling air flowing from the outlet of the turbine is selectively directly supplied to the air circulation line through the first cooling line to perform cooling in the interior.

10. The apparatus according to claim 9, wherein:

a second cooling line is connected to the cooling line, an air circulation line is configured to circulate air in an interior of the aircraft, and an air-conditioning heat exchanger is disposed between the air circulation line and the second cooling line, and air flowing through the air circulation line is selectively cooled by the cooling air in the air-conditioning heat exchanger to perform cooling in the interior.

11. The apparatus according to claim 10, wherein the second cooling line is connected to the cooling heat exchanger downstream of the air-conditioning heat exchanger, and the cooling air cools the refrigerant in the cooling heat exchanger.

12. The apparatus according to claim 9, wherein the refrigerant circulation line is connected to the air circulation line in the aircraft through a refrigerant-air heat exchanger upstream of the cooling heat exchanger, and heat from the heated refrigerant flowing through the refrigerant circulation line is selectively transmitted from the refrigerant-air heat exchanger to air in the air circulation line to perform heating in an interior of the aircraft.

13. An apparatus comprising:

a shaft installed in an aircraft, the shaft being rotatable by having a motor coupled thereto;

a compressor, rotatable by being connected to the shaft, configured to form a flow of heated compressed air by compressing a first portion of external air introduced into the aircraft;

a heat exchanger configured to heat-exchange the heated compressed air with a second portion of the external air introduced into the aircraft;

a turbine, rotatable by being connected to the shaft, configured to form a flow of cooling air by expanding the heat-exchanged compressed air;

a heating line configured to supply the heated compressed air flowing from an outlet of the compressor to a refrigerant circulation line for circulating a refrigerant cooling a fuel cell power train;

an air circulation line configured to circulate air in an interior of the aircraft;

a refrigerant-air heat exchanger disposed between the refrigerant circulation line and the air circulation line and configured to heat-exchange the refrigerant with air; and a cooling line connected to an outlet of the turbine, through which cooling air flowing from the outlet of the turbine flows, wherein a cooling heat exchanger is disposed between the cooling line and the refrigerant circulation line, and a heated refrigerant flowing through the refrigerant circulation line is selectively cooled by the cooling air in the cooling heat exchanger.

14. The apparatus of claim 13, wherein a second heating line is connected between the heating line and the air circulation line, and the heated compressed air is selectively directly supplied to the air circulation line.

15. The apparatus of claim 14, wherein when the heated compressed air is supplied to the second heating line and air is circulated without exhaust in the air circulation line, the interior is configured to be pressurized.

16. The apparatus of claim 13, wherein a heating heat exchanger is disposed between the heating line and the refrigerant circulation line, and heat from the heated compressed air flowing through the heating line is selectively transmitted from the heating heat exchanger to the refrigerant to increase a temperature of the fuel cell power train.

17. The apparatus of claim 13, wherein a first cooling line is connected between the air circulation line and the cooling line, and the cooling air is selectively directly supplied to the air circulation line to perform cooling in the interior.

18. The apparatus of claim 13, wherein a second cooling line is connected to the cooling line, and an air-conditioning heat exchanger is disposed between the air circulation line and the second cooling line, and air flowing through the air circulation line is selectively cooled by the cooling air in the air-conditioning heat exchanger to perform cooling in the interior.

* * * * *